US012659078B2

(12) United States Patent
Takahashi et al.

(10) Patent No.: US 12,659,078 B2
(45) Date of Patent: Jun. 16, 2026

(54) COMMUNICATION APPARATUS, COMMUNICATION METHOD, AND COMMUNICATION SYSTEM

(71) Applicant: SONY GROUP CORPORATION, Tokyo (JP)

(72) Inventors: Mitsuki Takahashi, Tokyo (JP); Kazuyuki Shimezawa, Tokyo (JP); Hiromasa Uchiyama, Tokyo (JP); Hiroki Matsuda, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 18/714,444

(22) PCT Filed: Nov. 18, 2022

(86) PCT No.: PCT/JP2022/042798
§ 371 (c)(1),
(2) Date: May 29, 2024

(87) PCT Pub. No.: WO2023/106066
PCT Pub. Date: Jun. 15, 2023

(65) Prior Publication Data
US 2025/0175281 A1 May 29, 2025

(30) Foreign Application Priority Data
Dec. 6, 2021 (JP) ................................. 2021-197994

(51) Int. Cl.
*H04L 1/00* (2006.01)
(52) U.S. Cl.
CPC ............ *H04L 1/0061* (2013.01); *H04L 1/008* (2013.01)

(58) Field of Classification Search
CPC ....... H04L 1/0057; H04L 1/0061; H04L 1/00; H04L 1/008
See application file for complete search history.

(56) References Cited

U.S. PATENT DOCUMENTS

| | | | | |
|---|---|---|---|---|
| 8,839,078 B2 * | 9/2014 | Abu-Surra | ............ | H04L 1/0057 |
| | | | | 714/776 |
| 10,341,149 B2 * | 7/2019 | Park | ........................ | H04L 12/12 |

(Continued)

FOREIGN PATENT DOCUMENTS

| | | |
|---|---|---|
| JP | 2011-211616 A | 10/2011 |
| JP | 2021-527990 A | 10/2021 |

OTHER PUBLICATIONS

International Search Report and Written Opinion of PCT Application No. PCT/JP2022/042798, issued on Jan. 17, 2023, 09 pages of ISRWO.

(Continued)

*Primary Examiner* — Esaw T Abraham
(74) *Attorney, Agent, or Firm* — CHIP LAW GROUP

(57) ABSTRACT

A communication apparatus includes a discriminator that determines whether or not to execute packet coding for generating a plurality of encoded bit sequences having different contents from one transmission data sequence, according to a predetermined condition, a generator that generates a plurality of bit sequences from one transmission data sequence using the packet coding in a case where it is determined that the packet coding is to be performed, and generates one or a plurality of bit sequences from one transmission data sequence without using the packet coding in a case where it is determined that the packet coding is not to be performed, and a distributor that distributes the plurality of bit sequences to a plurality of channels in a case (Continued)

where the plurality of bit sequences has been generated from the one transmission data sequence.

18 Claims, 17 Drawing Sheets

(56)                    References Cited

U.S. PATENT DOCUMENTS

| | | | |
|---|---|---|---|
| 10,771,189 B2 * | 9/2020 | Das Sharma | ......... H04L 1/0041 |
| 11,496,238 B2 * | 11/2022 | Chen | ..................... H04L 1/0016 |
| 11,757,569 B2 * | 9/2023 | Murakami | .......... H03M 13/616 |
| | | | 714/755 |
| 2020/0029379 A1 | 1/2020 | Xiao et al. | |
| 2020/0092944 A1 | 3/2020 | Baek et al. | |

OTHER PUBLICATIONS

"Packet Data Convergence Protocol (PDCP) specification", 3GPP TS 38.323 V16.3.0, 3rd Generation Partnership Project; Technical Specification Group Radio Access Network, Release 16, Mar. 2021, 40 pages.
"Linear Packet Coding in L2 for RAN performance improvement", Intel, 3GPP TSG RAN, Release 18 Workshop, RWS-210368, Jun. 28-Jul. 2, 2021, 14 pages.
"On Coding Evolution for Rel-18 & beyond", Qualcomm, 3GPP TSG RAN Release 18 Workshop, RWS-210028, Jun. 28-Jul. 2, 2021, 12 pages.
"Discussion on Network coding for 5G Advanced", ZTE, 3GPP TSG RAN, Release 18 workshop, RWS-210484, Jun. 28-Jul. 2, 2021, 9 pages.

* cited by examiner

INFORMATION
SEQUENCE
FROM UPPER
LAYER

INFORMATION
SEQUENCE TO
UPPER LAYER

ONE BIT
SEQUENCE

DIVIDE

ONE BIT
SEQUENCEGROUP

ENCODED BIT
SEQUENCE GROUP

ENCODED BIT SEQUENCE | REDUNDANT DATA

SEQUENCE IDENTIFICATION DATA | ERROR DETECTION DATA

DRAWING
REPRESENTATION

| s | 1 | 2 | 3 |
|---|---|---|---|

| x | 1 | 2 | 3 | 1+2+3 |
|---|---|---|---|---|

MATRIX
REPRESENTATION $$\begin{bmatrix} x_1 \\ x_2 \\ x_3 \\ x_4 \end{bmatrix} = \begin{bmatrix} 1 & 0 & 0 \\ 0 & 1 & 0 \\ 0 & 0 & 1 \\ 1 & 1 & 1 \end{bmatrix} \begin{bmatrix} s_1 \\ s_2 \\ s_3 \end{bmatrix}$$

HERE $x, s \in \mathbb{F}_2^n$        n REPRESENTS ORDER OF VECTOR

DRAWING
REPRESENTATION s  [  1  ]  [  2  ]  [  3  ]

x  [  1  ]  [  2  ]  [  1+2+3  ]

MATRIX
REPRESENTATION $$\begin{bmatrix} x_1 \\ x_2 \\ x_4 \end{bmatrix} = \begin{bmatrix} 1 & 0 & 0 \\ 0 & 1 & 0 \\ 1 & 1 & 1 \end{bmatrix} \begin{bmatrix} s_1 \\ s_2 \\ s_3 \end{bmatrix}$$

FIG.19

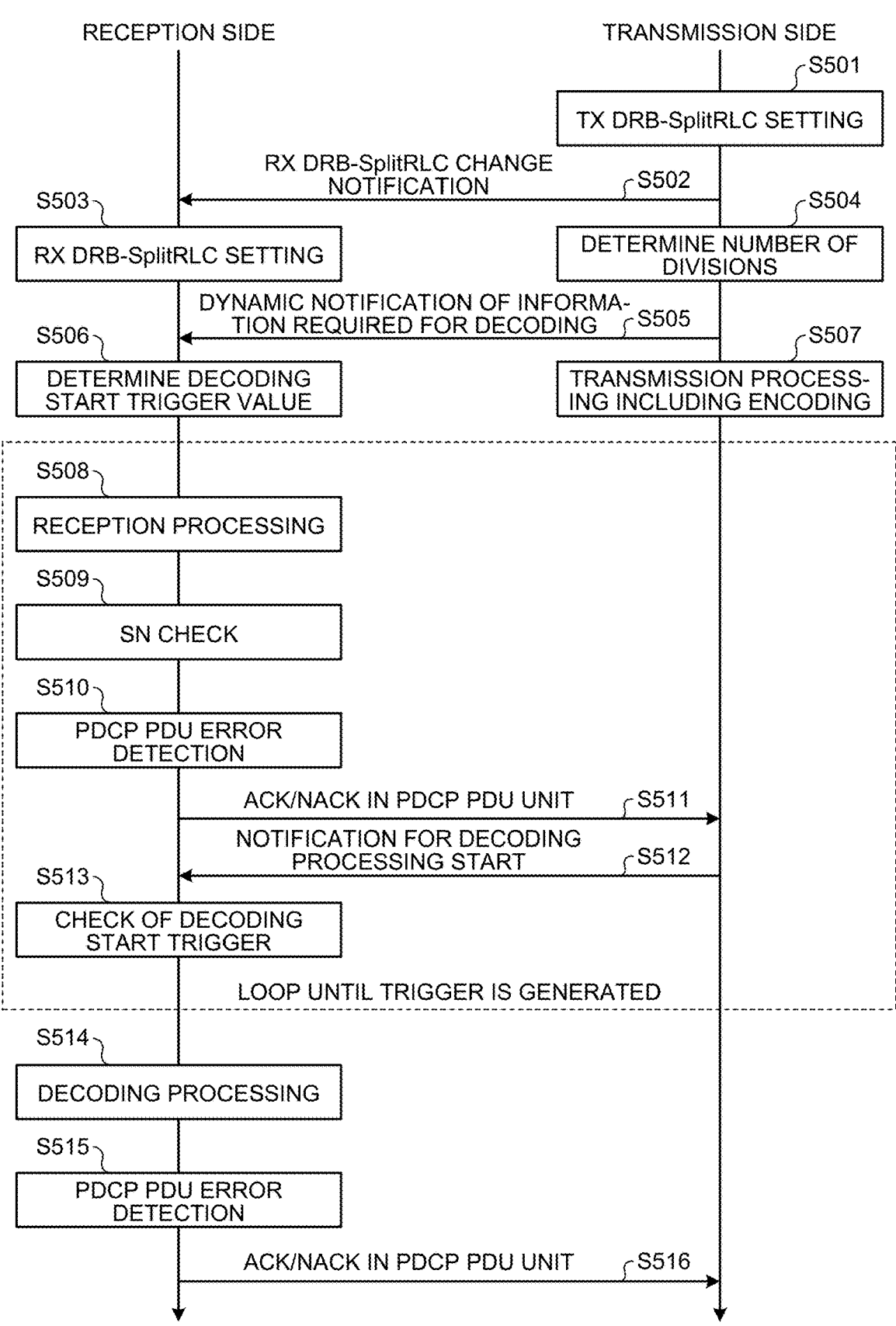

RECEPTION SIDE

TRANSMISSION SIDE

S501

TX DRB-SplitRLC SETTING

RX DRB-SplitRLC CHANGE NOTIFICATION    S502

S503

RX DRB-SplitRLC SETTING

S504

DETERMINE NUMBER OF DIVISIONS

DYNAMIC NOTIFICATION OF INFORMATION REQUIRED FOR DECODING    S505

S506

DETERMINE DECODING START TRIGGER VALUE

S507

TRANSMISSION PROCESSING INCLUDING ENCODING

S508

RECEPTION PROCESSING

S509

SN CHECK

S510

PDCP PDU ERROR DETECTION

ACK/NACK IN PDCP PDU UNIT    S511

NOTIFICATION FOR DECODING PROCESSING START    S512

S513

CHECK OF DECODING START TRIGGER

LOOP UNTIL TRIGGER IS GENERATED

S514

DECODING PROCESSING

S515

PDCP PDU ERROR DETECTION

ACK/NACK IN PDCP PDU UNIT    S516

COMMUNICATION APPARATUS, COMMUNICATION METHOD, AND COMMUNICATION SYSTEM

CROSS REFERENCE TO RELATED APPLICATIONS

This application is a U.S. National Phase of International Patent Application No. PCT/JP2022/042798 filed on Nov. 18, 2022, which claims priority benefit of Japanese Patent Application No. JP 2021-197994 filed in the Japan Patent Office on Dec. 6, 2021. Each of the above-referenced applications is hereby incorporated herein by reference in its entirety.

FIELD

The present disclosure relates to a communication apparatus, a communication method, and a communication system.

BACKGROUND

Communication with high communication performance (for example, high reliability, low delay, and high frequency utilization efficiency) capable of coping with various use cases is required. For example, in 5G of the next generation communication standard, in order to cope with various use cases, Ultra-Reliable and Low Latency Communication (URLLC) which means ultra high reliability and low latency communication is defined. In order to improve communication reliability, in recent years, there is a case where a technology called Packet Duplication using a plurality of independent channels is used (for example, Non Patent Literature 1 (3GPP TS 38.323 v16.3.0)).

CITATION LIST

Non Patent Literature

Non Patent Literature 1: 3GPP TS 38.323 v16.3.0 (2021-03), Release 16, "Packet Data Convergence Protocol (PDCP) specification"

Non Patent Literature 2: 3GPP TSG RAN Release 18 Workshop, RWS-210368, "Linear Packet Coding in L2 for PAN performance improvement", Intel.

Non Patent Literature 3: 3GPP TSG RAN Release 18 Workshop, RWS-210028, "On Coding Evolution for Rel-18 & beyond", Qualcomm.

Non Patent Literature 4: 3GPP TSG RAN Release 18 Workshop, RWS-210484, "Discussion on Network coding for 5G Advanced", ZTE.

SUMMARY

Technical Problem

The introduction of one technology may result in a certain improvement for one communication performance but a reduction for another communication performance. For example, in the above-described example of packet duplication, although communication reliability is improved, frequency utilization efficiency is significantly reduced because the same data will be transmitted on a plurality of channels.

Therefore, technologies for performing encoding in units of packets have been proposed as technologies for securing improvement in reliability to some extent while improving frequency utilization efficiency (for example, Non Patent Literature 2 (3GPP RWS-210368), Non Patent Literature 3 (3GPP RWS-210028), and Non Patent Literature 4 (3GPP RWS-210484)).

However, these technologies do not consider any implementation method (for example, a procedure or signaling). Therefore, high communication performance cannot be achieved simply by replacing the packet complication with these technologies.

Therefore, the present disclosure proposes a communication apparatus, a communication method, and a communication system that can achieve high communication performance.

Note that the above problem or object is merely one of a plurality of problems or objects that can be solved or achieved by a plurality of embodiments disclosed in the present specification.

Solution to Problem

In order to solve the above problem, a communication apparatus according to one embodiment of the present disclosure includes: a discriminator that determines whether or not to execute packet coding for generating a plurality of encoded bit sequences having different contents from one transmission data sequence, according to a predetermined condition; a generator that generates a plurality of bit sequences from one transmission data sequence using the packet coding in a case where it is determined that the packet coding is to be performed, and generates one or a plurality of bit sequences from one transmission data sequence without using the packet coding in a case where it is determined that the packet coding is not to be performed; and a distributor that distributes the plurality of bit sequences to a plurality of channels in a case where the plurality of bit sequences has been generated from the one transmission data sequence.

BRIEF DESCRIPTION OF DRAWINGS

FIG. 19 is a sequence diagram illustrating signaling according to the present embodiment.

DESCRIPTION OF EMBODIMENTS

Figure 1:
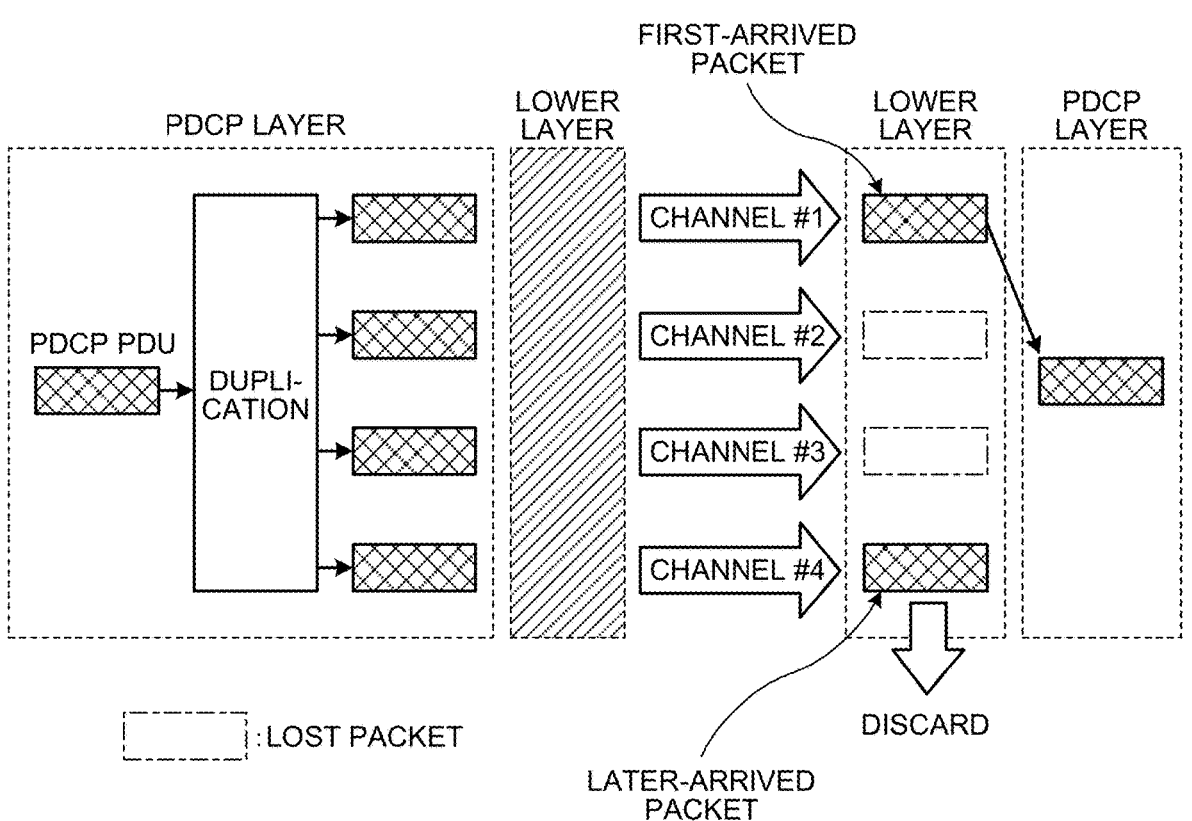
FIG. 1 is a diagram for describing the PDCP duplication.

Hereinafter, embodiments of the present disclosure will be described in detail with reference to the drawings. In each of the following embodiments, the same parts are denoted by the same reference numerals, and the duplicate description will be omitted.

In addition, in the present specification and the drawings, a plurality of components having substantially the same functional configuration may be distinguished by attaching different numerals after the same reference numerals. For example, a plurality of configurations having substantially the same functional configuration is distinguished as terminal devices $40_1$, $40_2$, and $40_3$ as necessary. However, if it is not particularly necessary to distinguish each of the plurality of components having substantially the same functional configuration, only the same reference numeral is attached. For example, in a case where it is not necessary to particularly distinguish the terminal devices $40_1$, $40_2$, and $40_3$, the terminal devices are simply referred to as the terminal device 40.

One or a plurality of embodiments (including examples and modifications) described below can each be implemented independently. On the other hand, at least some of the plurality of embodiments described below may be appropriately combined with at least some of other embodiments to be implemented. The plurality of embodiments can include novel features different from each other. Therefore, the plurality of embodiments can contribute to solving different objects or problems from each other and can exhibit different effects from each other.

1. Overview

Radio access technology (RAT) such as long term evolution (LTE) and new radio (NR) has been studied in the 3rd generation partnership project (3GPP). LTE and NR are types of cellular communication technology, and enable mobile communication of a terminal device by arranging a plurality of areas covered by a base station in a cell shape. At this time, one base station may manage a plurality of cells.

Note that, in the following description, "LTE" includes LTE-Advanced (LTE-A), LTE-Advanced Pro (LTE-A Pro), and Evolved Universal Terrestrial Radio Access (E-UTRA). In addition, NR includes New Radio Access Technology (NRAT) and Further E-UTRA (FE-UTRA). In the following description, a cell corresponding to LTE is referred to as an LTE cell, and a cell corresponding to NR is referred to as an NR cell.

NR is a next generation (fifth generation) radio access technology (RAT) of LTE. NR is a radio access technology that can support various use cases including enhanced mobile broadband (eMBB), massive machine type communications (mMTC), and ultra-reliable and low latency communications (URLLC). NR has been studied aiming at a technical framework corresponding to usage scenarios, requirement conditions, arrangement scenarios, and the like in these use cases.

In recent years, further improvement in communication performance (for example, further increase in capacity, increase in speed, decrease in delay, increase in reliability, decrease in power consumption, or decrease in processing load) is desired. In order to achieve high communication performance, various technologies are used, but high communication performance cannot necessarily be achieved only by using the conventional technology as it is.

Hereinafter, examples of the related art include a PDCP duplication (Packet Data Convergence Protocol Duplication) described in Non Patent Literature 1 (3GPP TS 38.323 version 16.2.0 Release 16), and packet coding described in Non Patent Literature 2 (3GPP RWS-210368), Non Patent Literature 3 (3GPP RWS-210028), and Non Patent Literature 4 (3GPP RWS-210484).

<1-1. PDCP Duplication>

In Non Patent Literature 1 (3GPP TS 38.323 v16.3.0), a function of replicating a PDCP PDU in a PDCP layer is standardized. This function is called PDCP duplication. FIG. 1 is a diagram for describing the PDCP duplication. The PDCP duplication is a technology for improving communication reliability. The PDCP duplication is a type of packet duplication.

In the PDCP duplication, the communication apparatus performs replication of data units to transmit the same data unit to a plurality of independent channels. The communication apparatus transmits the replicated data unit by using the plurality of independent channels. Here, as a technology of using a plurality of independent channels, a technology of simultaneously using a plurality of independent communication paths (channels) when a base station communicates with one terminal, such as dual connectivity and carrier aggregation, is known. There are mainly two purposes of these technologies. One is to achieve large-capacity communication by expanding communication capacity by using a plurality of independent communication paths. The other is to obtain spatial diversity and improve communication reliability by using a plurality of communication paths. The PDCP duplication is used in communications using a plurality of independent channels to improve such reliability.

On the other hand, a disadvantage of the PDCP duplication lies in frequency utilization efficiency. For example, in the PDCP duplication, if one of the same data sent from an independent channel can be correctly received, the data sent from the remaining channels is all discarded regardless of successful communication. Here, it is assumed that the coding rate below the PDCP layer is constant in each channel and the channel capacity is also constant. Under this assumption, the frequency utilization efficiency is compared between the case of using the PDCP duplication and the case of not using the PDCP duplication. Then, it can be learned that, when the PDCP duplication is used, N times as many frequency resources are used as when the PDCP duplication is not used. Here, N is the number of independent channels used for communication.

In the reception processing performed by the PDCP duplication, a decoding gain is poor and frequency utilization efficiency is significantly low as compared with a technology of adding likelihoods such as Hybrid Automatic Repeat reQuest (HARQ) or an encoding technology of correcting an error using parity. That is, when the PDCP duplication is used, communication reliability is improved, but frequency utilization efficiency is significantly reduced.

Non Patent Literature 1 (3GPP TS 38.323 v16.3.0) defines activation/deactivation of PDCP duplication as follows.

(PDCP Duplication Activation/Deactivation)

For the PDCP entity configured with, the transmitting PDCP entity shall:

for SRBs:

activate the PDCP duplication;

for DRBs:

if the activation of PDCP duplication is indicated for the DRB:

activate the PDCP duplication for the DRB;

if the activation of PDCP duplication is indicated for at least one associated RLC entities:

activate the PDCP duplication for the indicated associated RLC entities;

activate the PDCP duplication for the DRB;

if the deactivation of PDCP duplication is indicated for the DRB:

deactivate the PDCP duplication for the DRB;

if the deactivation of PDCP duplication is indicated for at least one associated RLC entities:

deactivate the PDCP duplication for the indicated associated RLC entities;

if all associated RLC entities other than the primary RLC entity are deactivated for PDCP duplication:

deactivate the PDCP duplication for the DRB.

The activation/deactivation is performed for an RLC entity associated with a radio bearer (RB) or a PDCP entity. By pdcp-Duplication that is a variable of a PDCP configuration (PDCP Configure) defined in a radio resource control layer (RRC layer), an operation of a PDCP entity whose PDCP duplication is indicated depends on which RB (Radio Bearer) the PDCP entity is defined by.

In this document, when a duplication is activated for an RLC entity or a data radio bearer (DRB), a duplicated PDU on a transmission side is discarded as follows.

(Duplicated PDCP PDU Discard)

For the PDCP entity configured with pdcp-Duplication, the transmitting PDCP entity shall:

if the successful delivery of a PDCP Data PDU is confirmed by one of the associated AM RLC entities:

indicate to the other AM RLC entities to discard the duplicated PDCP Data PDU;

if the deactivation of PDCP duplication is indicated for the DRB:

indicate to the RLC entities other than the primary RLC entity to discard all duplicated PDCP Data PDUs;

if the deactivation of PDCP duplication is indicated for at least one associated RLC entities:

indicate to the RLC entities deactivated for PDCP duplication to discard all duplicated PDCP Data PDUs.

In this document, when a PDCP duplication is activated for a radio bearer (RB), a PDCP entity on a transmission side performs processing on an RLC entity associated with the PDCP entity as follows.

(Transmitter Side Procedure)

if the PDCP duplication is activated for the RB:

if the PDCP PDU is a PDCP Data PDU:

duplicate the PDCP Data PDU and submit the PDCP Data PDU to the associated RLC entities activated for PDCP duplication;

else submit the PDCP Control PDU to the primary RLC entity;

In this document, when a duplication is activated for a radio bearer (RB) is performed, a notification (data volume calculation) of the size of the PDCP PDU to a MAC entity as follows.

(Data Volume Calculation)

if the PDCP duplication is activated for the RB:

indicate the PDCP data volume to the MAC entity associated with the primary RLC entity;

indicate the PDCP data volume excluding the PDCP Control PDU to the MAC entity associated with the RLC entity other than the primary RLC entity activated for PDCP duplication;

indicate the PDCP data volume as 0 to the MAC entity associated with RLC entity deactivated for PDCP duplication;

In this document, when a duplication of a radio bearer (RB) defining a PDCP entity is activated, the number of RLC entities associated with the PDCP entity is defined as follows.

(RLC Entity)

For RBs configured with PDCP duplication, each PDCP entity is associated with N UM RLC entities (for same direction), 2×N UM RLC entities (N for each direction), or N AM RLC entities, where $2 <= N <= 4$;

On the other hand, the same standard does not define that packet coding is performed in the same PDCP layer.

<1-2. Packet Coding>

Figure 2:
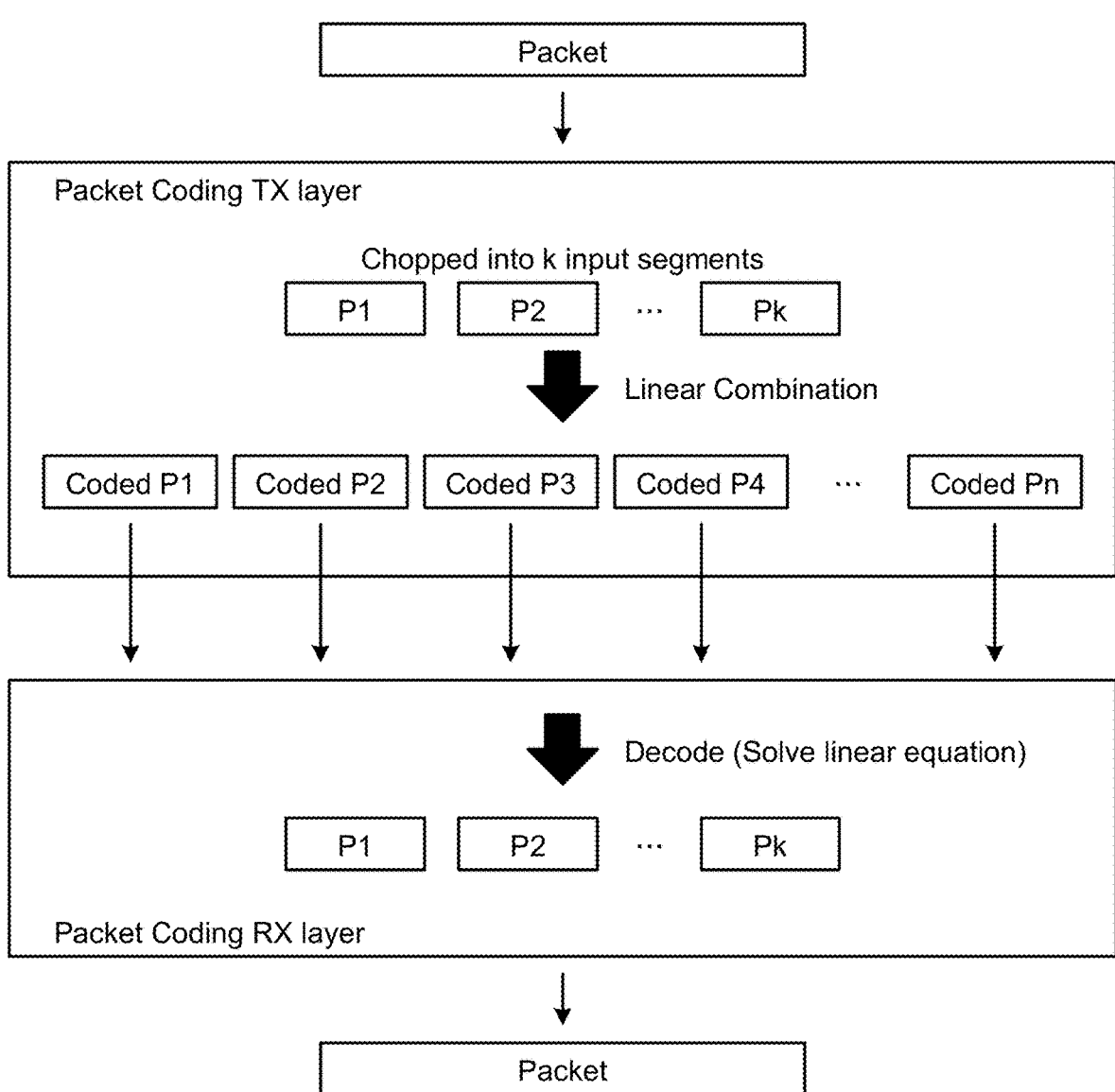
FIG. 2 is a diagram illustrating an overview of packet coding.

Next, packet coding will be described. Non Patent Literature 2 (3GPP RWS-210368), Non Patent Literature 3 (3GPP RWS-210028), and Non Patent Literature 4 (3GPP RWS-210484) describe utilizing packet coding as a method for solving the problem of the PDCP duplication. FIG. 2 is a diagram illustrating an overview of packet coding. In the packet coding, the communication apparatus on the transmission side (1) divides one transmission data sequence (Paket in the drawing) into a plurality of segments (P1, P2, . . . , Pk in the drawing), and (2) generates a plurality of encoded sequences (Coded P1, Coded P2, . . . , Coded Pk in the drawing) from the plurality of segments. It is assumed that the plurality of encoded sequences is distributed according to the RLC entity associated with the PDCP entity or other conditions.

Figure 3:
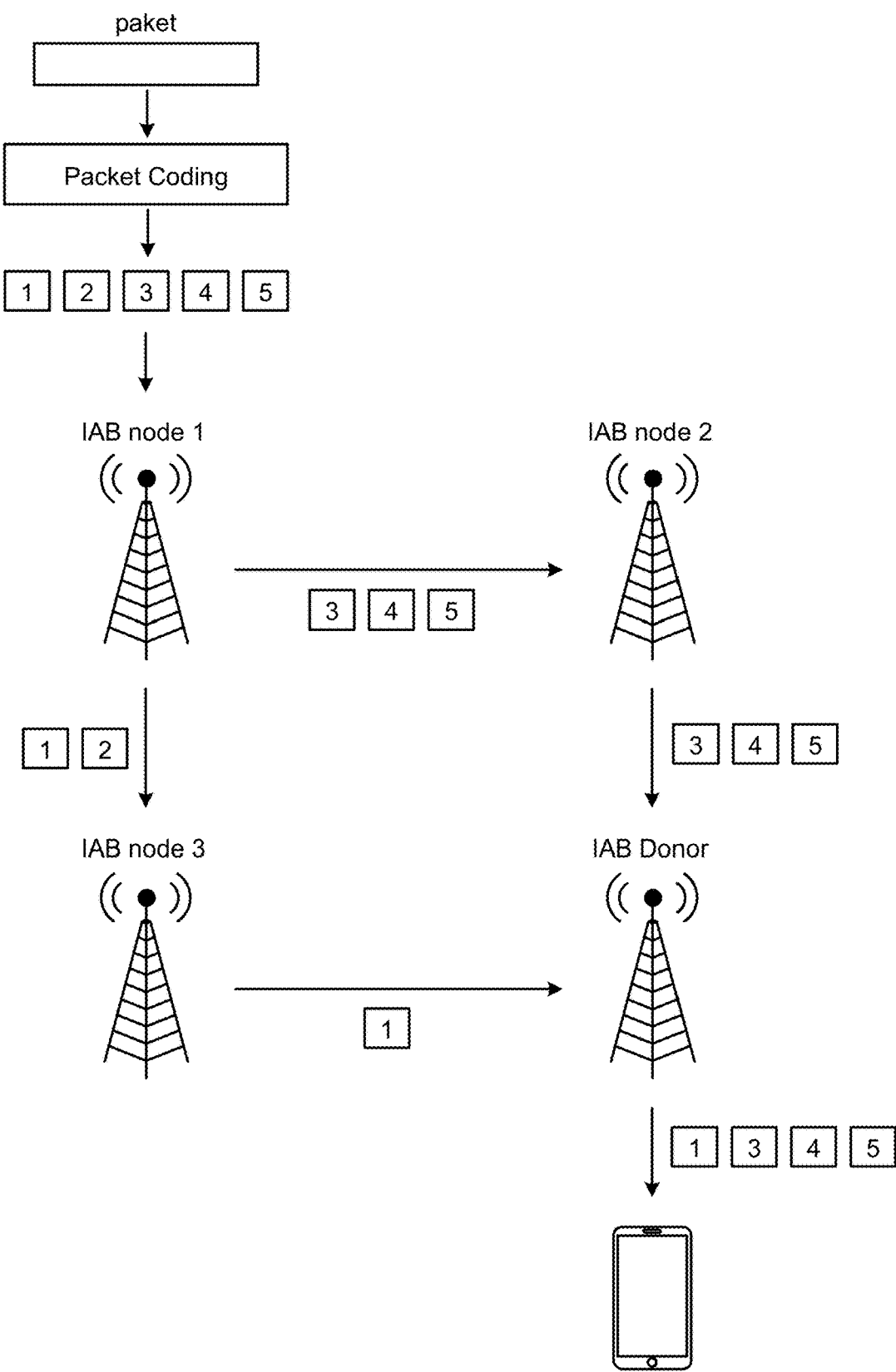
FIG. 3 is a diagram illustrating an application example of packet coding in an IAB region.

FIG. 3 is a diagram illustrating an application example of packet coding in an IAB region. In the example of FIG. 2, the path for transmitting data to an IAB donor is made up of a plurality of IAB nodes. In the example of FIG. 3, the IAB node 1 that has received the coded data distributes the data to a plurality of paths and transmits the data. The distributed data is aggregated into one IAB donor. Then, data transmission between the base station (IAB donor) and a terminal (UE) is started.

<1-3. Problem and Solution>

By using packet coding, improvement of a quantity of frequency resources and improvement of communication reliability are achieved. However, in the above document, a method for implementing packet coding is not discussed. For example, the above document does not discuss any specific procedure or signaling for the communication apparatus to use packet coding. In particular, the document does not consider a procedure or signaling for actively or passively controlling the number of parity generation, the transmission method, and the distribution method according to any request. Procedures and signaling are important points that influence communication efficiency.

Therefore, the communication apparatus (for example, a base station and a terminal device) according to the present embodiment determines whether or not to execute packet coding for generating a plurality of encoded bit sequences having different contents from one transmission data sequence according to a predetermined condition. For example, bearer information indicating whether or not to use packet coding for transmission of a transmission data sequence is associated with a bearer used for transmission of a transmission data sequence, and the communication apparatus determines whether or not to perform packet coding on the basis of the bearer information. Then, the communication apparatus generates a plurality of bit sequences from one transmission data sequence using packet coding when it is determined that packet coding is to be performed, and generates one or a plurality of bit sequences from one transmission data sequence without using packet coding when it is determined that packet coding is not to be performed. When a plurality of bit sequences is generated from one transmission data sequence, the communication apparatus distributes the generated plurality of bit sequences to a plurality of channels and transmits the distributed bit sequences.

As a result, the communication apparatus according to the present embodiment can achieve high frequency utilization efficiency while maintaining the communication reliability.

Although the overview of the present embodiment has been described above, the communication system according to the present embodiment will be described in detail below.

2. Configuration of Communication System

Hereinafter, a configuration of a communication system 1 will be specifically described with reference to the drawings.
<2-1. Overall Configuration of Communication System>

Figure 4:
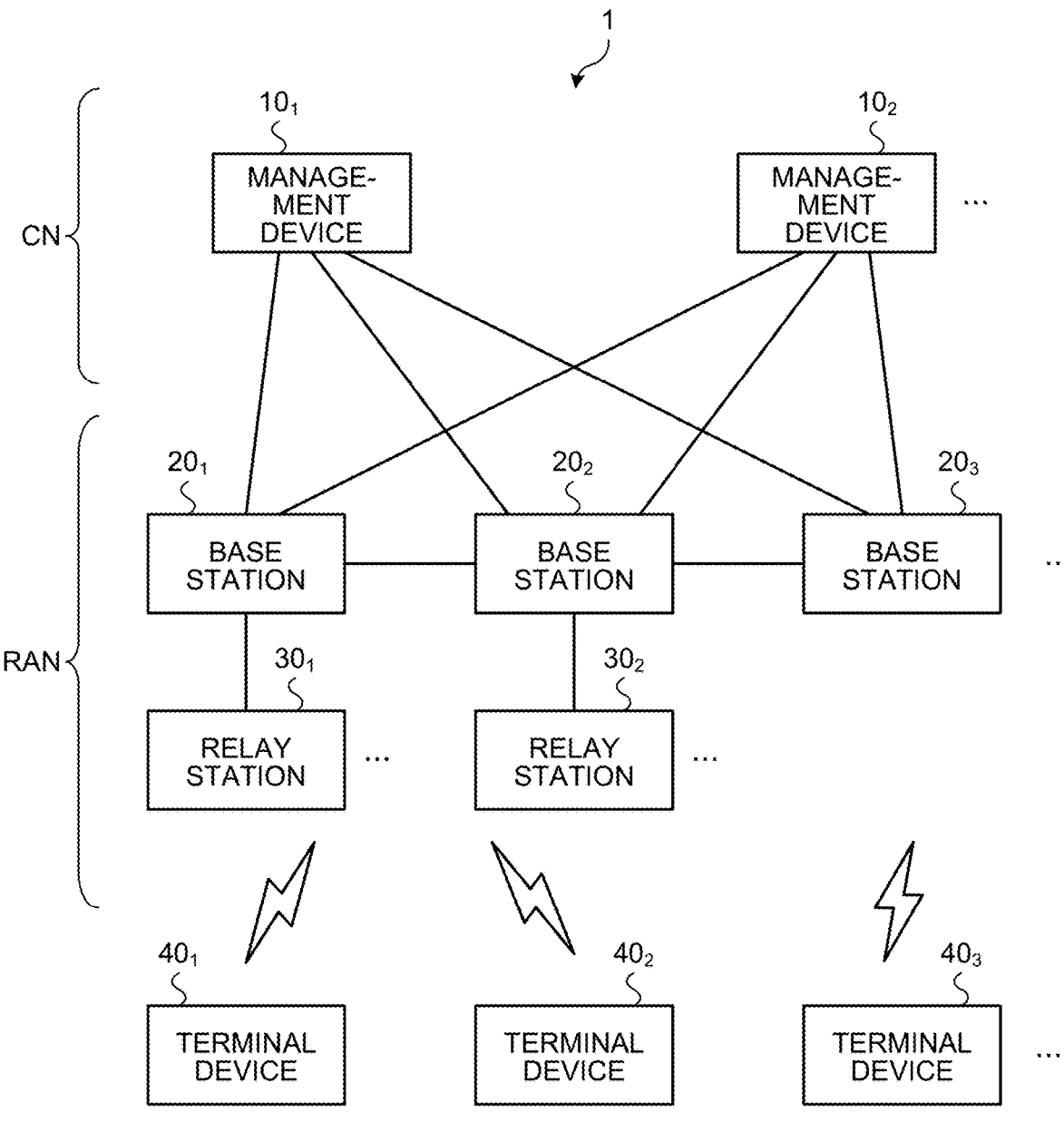
FIG. 4 is a diagram illustrating a configuration example of a communication system according to an embodiment of the present disclosure.

FIG. 4 is a diagram illustrating a configuration example of the communication system 1 according to an embodiment of the present disclosure. The communication system 1 includes a management device 10, a base station 20, a relay station 30, and a terminal device 40. The communication system 1 provides the user with a wireless network capable of mobile communication by the wireless communication apparatus constituting the communication system 1 operating in cooperation. The wireless network of the present embodiment includes, for example, a radio access network and a core network. Note that, in the present embodiment, the wireless communication apparatus is an apparatus having a function of wireless communication, and corresponds to the base station 20, the relay station 30, and the terminal device 40 in the example of FIG. 4.

The communication system 1 may include a plurality of management devices 10, a plurality of base stations 20, a plurality of relay stations 30, and a plurality of terminal devices 40. In the example of FIG. 4, the communication system 1 includes management devices 10₁ and 10₂ as the management device 10, and includes base stations 20₁ and 20₂ as the base station 20. Furthermore, the communication system 1 includes relay stations 30₁ and 30₂ and the like as the relay station 30, and includes terminal devices 40₁, 40₂, and 40₃ and the like as the terminal device 40.

Note that the devices in the drawings may be considered as devices in a logical sense. That is, a part of the device in the drawing may be implemented as a virtual machine (VM), a container, a docker, or the like, and they may be implemented on physically the same hardware.

Note that the communication system 1 may support radio access technology (RAT) such as long term evolution (LTE) and new radio (NR). LTE and NR are types of cellular communication technology, and enable mobile communication of a terminal device by arranging a plurality of areas covered by a base station in a cell shape.

Note that the radio access scheme used by the communication system 1 is not limited to LTE and NR, and may be another radio access scheme such as Wideband Code Division Multiple Access (W-CDMA) or Code Division Multiple Access 2000 (cdma 2000).

Furthermore, the base station or the relay station constituting the communication system 1 may be a ground station or a non-ground station. The non-ground station may be a satellite station or an aircraft station. If the non-ground station is a satellite station, the communication system 1 may be a Bent-pipe (Transparent) type mobile satellite communication system.

In the present embodiment, the ground station (also referred to as a ground base station) refers to a base station (a relay station) installed on the ground. Here, the "ground" is a ground in a broad sense including not only land but also underground, on water, and under water. Note that, in the following description, the description of "ground station" may be replaced with "gateway".

Note that an LTE base station may be referred to as an evolved node B (eNodeB) or an eNB. Further, an NR base station may be referred to as a gNodeB or a gNB. In LTE and NR, a terminal device (also referred to as a mobile station or a terminal) may be referred to as user equipment (UE). Note that the terminal device is a type of communication apparatus, and is also referred to as a mobile station or a terminal.

In the present embodiment, the concept of the communication apparatus includes not only a portable mobile device (terminal device) such as a mobile terminal but also a device installed in a structure or a moving object. A structure or a moving object itself may be regarded as a communication apparatus. In addition, the concept of the communication apparatus includes not only a terminal device but also a base station and a relay station. The communication apparatus is a type of processing apparatus and information processing apparatus. Furthermore, the communication apparatus can be rephrased as a transmission apparatus or a reception apparatus.

Hereinafter, a configuration of each device constituting the communication system 1 will be specifically described. Note that the configuration of each device described below is merely an example. The configuration of each device may be different from the following configuration.
<2-2. Configuration of Management Device>

Next, a configuration of the management device 10 will be described.

The management device 10 is a device that manages a wireless network. For example, the management device 10 is a device that manages communication of the base station 20. The management device 10 may be, for example, a device having a function as a mobility management entity (MME). The management device 10 may be a device having a function as an access and mobility management function (AMF) and/or a session management function (SMF). Of course, the functions of the management device 10 are not limited to the MME, the AMF, and the SMF. The management device 10 may be a device having a function as a network slice selection function (NSSF), an authentication server function (AUSF), a policy control function (PCF), or a unified data management (UDM). Furthermore, the management device 10 may be a device having a function as a home subscriber server (HSS).

Note that the management device 10 may have a function of a gateway. For example, the management device 10 may have a function as a serving gateway (S-GW) or a packet data network gateway (P-GW). Furthermore, the management device 10 may have a function as a user plane function (UPF).

The core network includes a plurality of network functions, and each network function may be aggregated into one physical device or distributed to a plurality of physical devices. That is, the management device 10 can be dispersedly arranged in a plurality of devices. Further, this distributed arrangement may be controlled to be performed dynamically. The base station 20 and the management device 10 constitute one network, and provide a wireless communication service to the terminal device 40. The management device 10 is connected to the Internet, and the terminal device 40 can use various services provided via the Internet via the base station 20.

Note that the management device 10 is not necessarily a device constituting the core network. For example, it is assumed that the core network is a core network of Wideband Code Division Multiple Access (W-CDMA) or Code Division Multiple Access 2000 (cdma 2000). At this time, the management device 10 may be a device that functions as a radio network controller (RNC).

Figure 5:
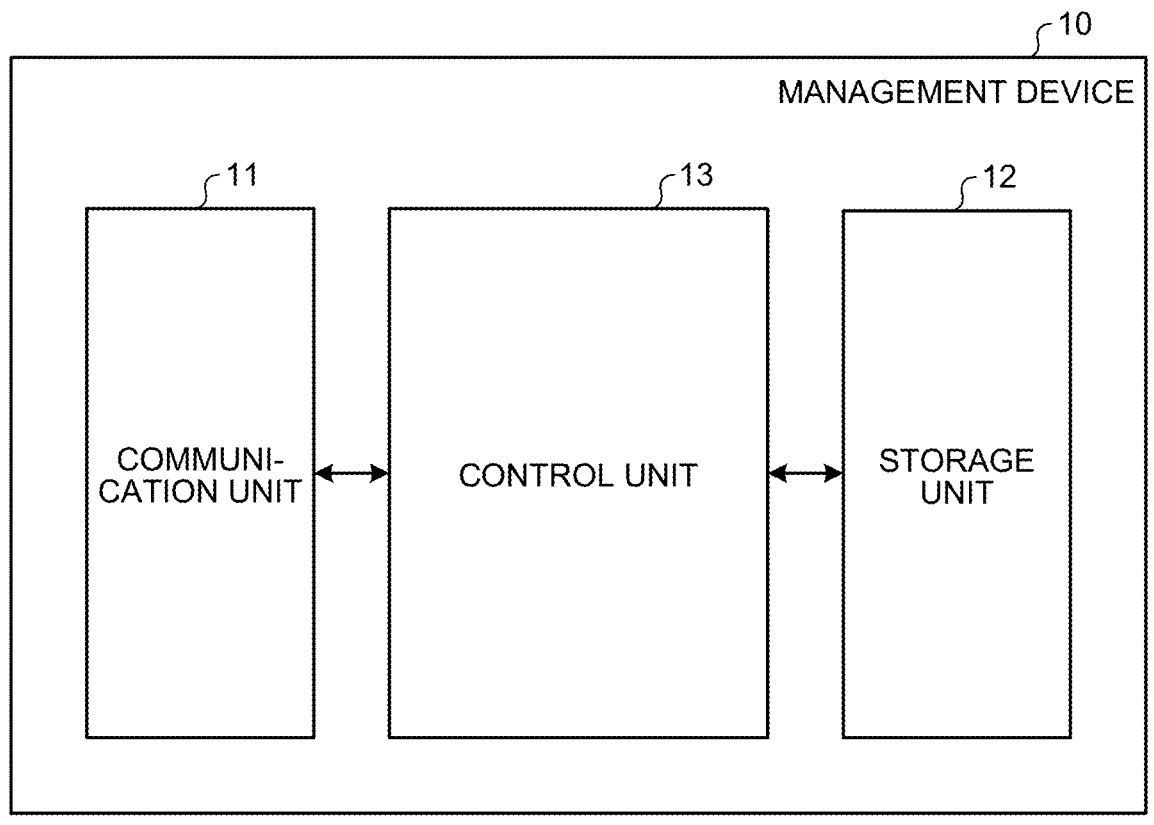
FIG. 5 is a diagram illustrating a configuration example of a management device according to an embodiment of the present disclosure.

FIG. 5 is a diagram illustrating a configuration example of the management device 10 according to an embodiment of the present disclosure. The management device 10 includes a communication unit 11, a storage unit 12, and a control unit 13. Note that the configuration illustrated in FIG. 5 is a functional configuration, and the hardware configuration may be different from this functional configuration. Furthermore, the functions of the management device 10 may be statically or dynamically distributed and implemented in a plurality of physically separated configurations. For example, the management device 10 may include a plurality of server devices.

The communication unit 11 is a communication interface for communicating with other devices. The communication unit 11 may be a network interface or a device connection interface. For example, the communication unit 11 may be a local area network (LAN) interface such as a network interface card (NIC), or may be a USB interface including a universal serial bus (USB) host controller, a USB port, and the like. Furthermore, the communication unit 11 may be a wired interface or a wireless interface. The communication unit 11 functions as a communication unit of the management device 10. The communication unit 11 communicates with the base station 20 and the like under the control of the control unit 13.

The storage unit 12 is a data readable/writable storage device such as a dynamic random access memory (DRAM), a static random access memory (SRAM), a flash memory, or a hard disk. The storage unit 12 functions as a storage unit of the management device 10. The storage unit 12 stores, for example, a connection state of the terminal device 40. For example, the storage unit 12 stores a radio resource control (RRC) state or an EPS connection management (ECM) state or a 5G system connection management (CM) state of the terminal device 40. The storage unit 12 may function as a home memory that stores the position information of the terminal device 40.

The control unit 13 is a controller that controls each unit of the management device 10. The control unit 13 is implemented by, for example, a processor such as a central processing unit (CPU), a micro processing unit (MPU), or a graphics processing unit (GPU). For example, the control unit 13 is implemented by the processor executing various programs stored in the storage device inside the management device 10 using a random access memory (RAN) or the like as a work region. Note that the control unit 13 may be implemented by an integrated circuit such as an application specific integrated circuit (ASIC) or a field programmable gate array (FPGA). Any of the CPU, the MPU, the GPU, the ASIC, and the FPGA can be regarded as a controller.

<2-3. Configuration of Base Station>

Next, a configuration of the base station 20 will be described.

The base station 20 is a wireless communication apparatus that wirelessly communicates with the terminal device 40. The base station 20 may be configured to wirelessly communicate with the terminal device 40 via the relay station 30, or may be configured to directly wirelessly communicate with the terminal device 40.

The base station 20 is a type of communication apparatus. More specifically, the base station 20 is an apparatus corresponding to a radio base station (Base Station, Node B, eNB, gNB, etc.) or a wireless access point. The base station 20 may be a wireless relay station. Furthermore, the base station 20 may be an optical extension apparatus called a remote radio head (RRH) or a radio unit (RU). Furthermore, the base station 20 may be a receiving station such as a field pickup unit (FPU). Furthermore, the base station 20 may be an Integrated Access and Backhaul (IAB) donor node or an IAB relay node that provides a radio access line and a radio backhaul line by time division multiplexing, frequency division multiplexing, or space division multiplexing.

Note that the radio access technology used by the base station 20 may be a cellular communication technology or a wireless LAN technology. Of course, the radio access technology used by the base station 20 is not limited thereto, and may be another radio access technology. For example, the radio access technology used by the base station 20 may be a low power wide area (LPWA) communication technology. Of course, the wireless communication used by the base station 20 may be wireless communication using millimeter waves. In addition, the wireless communication used by the base station 20 may be wireless communication using radio waves or wireless communication (optical radio) using infrared rays or visible light.

The base station 20 may be able to perform non-orthogonal multiple access (NOMA) communication with the terminal device 40. Here, the NOMA communication is communication (transmission, reception, or both) using a non-orthogonal resource. Note that the base station 20 may be able to perform NOMA communication with another base station 20.

Note that the base stations 20 may be able to communicate with each other via a base station-core network interface (for example, NG Interface, S1 Interface, and the like). This interface may be either wired or wireless. Furthermore, the base stations may be able to communicate with each other via an inter-base station interface (for example, Xn Interface, X2 Interface, S1 Interface, F1 Interface, and the like). This interface may be either wired or wireless.

Note that the concept of the base station includes not only a donor base station but also a relay base station (also referred to as a relay station.). For example, the relay base station may be any one of RF Repeater, Smart Repeater, and Intelligent Surface. In addition, the concept of the base station includes not only a structure having a function of the base station but also an apparatus installed in the structure.

The structure is, for example, a building such as a high-rise building, a house, a steel tower, a station facility, an airport facility, a harbor facility, an office building, a school building, a hospital, a factory, a commercial facility, or a stadium. Note that the concept of a structure includes not only a building but also a construction (non-building structure) such as a tunnel, a bridge, a dam, a wall, or an iron pillar, and equipment such as a crane, a gate, or a windmill. In addition, the concept of the structure includes not only a structure on land (on the ground in a narrow sense) or underground, but also a structure on water such as a pier or a mega float, and a structure under water such as a marine observation facility. The base station can be referred to as an information processing apparatus.

The base station 20 may be a donor station or a relay station. Furthermore, the base station 20 may be a fixed station or a mobile station. The mobile station is a wireless communication apparatus (for example, a base station) configured to be movable. At this time, the base station 20 may be a device installed in a moving object or may be a moving object itself. For example, a relay station having mobility can be regarded as the base station 20 as a mobile station. In addition, devices such as vehicles, unmanned aerial vehicles (UAVs) represented by drones, and smartphones, which are originally capable of mobility and have base station functions (or at least part of base station functions), also fall under the base station 20 as a mobile station.

Here, the moving object may be a mobile terminal such as a smartphone or a mobile phone. In addition, the moving object may be a moving object (for example, a vehicle such as an automobile, a bicycle, a bus, a truck, a motorcycle, a train, a linear motor car, or the like) that moves on land (on the ground in a narrow sense) or a moving object (for example, the subway) that moves underground (for example, in the tunnel). In addition, the moving object may be a moving object (for example, a ship such as a passenger ship, a cargo ship, a hovercraft, or the like) that moves on the water or a moving object (for example, a submersible such as a submersible, a submarine, and an unmanned submersible) that moves under water. Furthermore, the moving object may be a moving object (for example, an aircraft such as an airplane, an airship, or a drone) that moves in the air.

Furthermore, the base station 20 may be a ground base station (ground station) installed on the ground. For example, the base station 20 may be a base station arranged in a structure on the ground, or may be a base station installed in a moving object moving on the ground. More specifically, the base station 20 may be an antenna installed in a structure such as a building and a signal processing device connected to the antenna. Of course, the base station 20 may be a structure or a moving object itself. The "ground" is a ground in a broad sense including not only land (ground in a narrow sense) but also underground, on water, and under water. Note that the base station 20 is not limited to a ground base station. For example, in a case where the communication system 1 is a satellite communication system, the base station 20 may be an aircraft station. From the perspective of a satellite station, an aircraft station located on the earth is a ground station.

Note that the base station 20 is not limited to a ground station. The base station 20 may be a non-ground base station (non-ground station) capable of floating in the air or space. For example, the base station 20 may be an aircraft station or a satellite station.

The satellite station is a satellite station capable of floating outside the atmosphere. The satellite station may be an apparatus mounted on a space vehicle such as an artificial satellite, or may be a space vehicle itself. A space vehicle is a moving object that moves outside the atmosphere. Examples of the space vehicle include artificial bodies such as artificial satellites, spacecraft, space stations, and probes.

Note that the satellite serving as the satellite station may be any of a low earth orbiting (LEO) satellite, a medium earth orbiting (MEO) satellite, a geostationary earth orbiting (GEO) satellite, and a highly elliptical orbiting (HEO) satellite. Of course, the satellite station may be an apparatus mounted on a low earth orbiting satellite, a medium earth orbiting satellite, a geostationary earth orbiting satellite, or a highly elliptical orbiting satellite.

An aircraft station is a wireless communication apparatus capable of floating in the atmosphere, such as an aircraft. The aircraft station may be an apparatus mounted on an aircraft or the like, or may be an aircraft itself. Note that the concept of an aircraft includes not only heavy aircraft such as an airplane and a glider but also light aircraft such as a balloon and an airship. In addition, the concept of an aircraft includes not only a heavy aircraft and a light aircraft but also a rotorcraft such as a helicopter and an autogyro. Note that the aircraft station (alternatively, an aircraft on which an aircraft station is mounted) may be an unmanned aerial vehicle such as a drone.

Note that the concept of the unmanned aerial vehicle also includes an unmanned aircraft system (UAS) and a tethered UAS. The concept of unmanned aerial vehicles also includes Lighter than Air UAS (LTA) and Heavier than Air UAS (HTA). Other concepts of unmanned aerial vehicles also include High Altitude UAS Platforms (HAPs).

The size of the coverage of the base station 20 may be large such as a macro cell or small such as a pico cell. Of course, the size of the coverage of the base station 20 may be extremely small such as a femto cell. In addition, the base station 20 may have a beamforming capability. In this case, in the base station 20, a cell or a service area may be formed for each beam.

Figure 6:
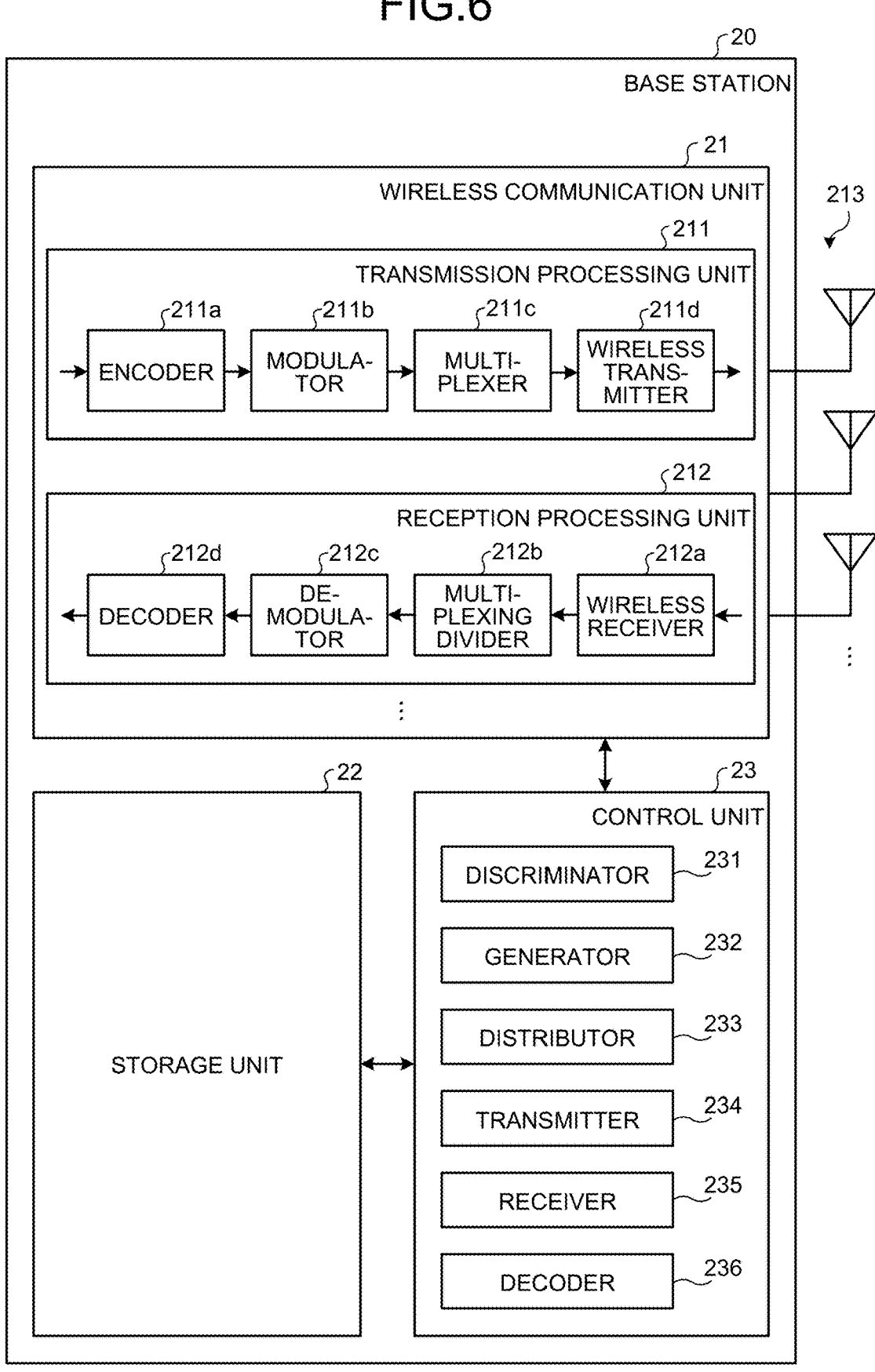
FIG. 6 is a diagram illustrating a configuration example of a base station according to an embodiment of the present disclosure.

FIG. 6 is a diagram illustrating a configuration example of the base station 20 according to an embodiment of the present disclosure. The base station 20 includes a wireless communication unit 21, a storage unit 22, and a control unit 23. Note that the configuration illustrated in FIG. 6 is a functional configuration, and the hardware configuration may be different from this functional configuration. Furthermore, the functions of the base station 20 may be implemented in a distributed manner in a plurality of physically separated configurations.

The wireless communication unit 21 is a signal processing unit for wirelessly communicating with other wireless communication apparatuses (for example, the terminal device 40). The wireless communication unit 21 operates under the control of the control unit 23. The wireless communication unit 21 corresponds to one or a plurality of wireless access methods. For example, the wireless communication unit 21 supports both NR and LTE. The wireless communication unit 21 may be compatible with W-CDMA or cdma 2000 in addition to NR or LTE. Furthermore, the wireless communication unit 21 may support an automatic retransmission technology such as Hybrid Automatic Repeat reQuest (HARQ).

The wireless communication unit 21 includes a transmission processing unit 211, a reception processing unit 212, and an antenna 213. The wireless communication unit 21 includes a plurality of transmission processing units 211, a plurality of reception processing units 212, and a plurality of antennas 213. When the wireless communication unit 21 supports a plurality of wireless access methods, each unit of the wireless communication unit 21 can be configured individually for each wireless access method. For example, the transmission processing unit 211 and the reception processing unit 212 may be individually configured by LTE and NR. Furthermore, the antenna 213 may include a plurality of antenna elements (for example, a plurality of patch antennas). In this case, the wireless communication unit 21 may be configured to be beamformable. The wireless communication unit 21 may be configured to be able to perform polarization beamforming using vertically polarized waves (V-polarized waves) and horizontally polarized waves (H-polarized waves).

The transmission processing unit 211 performs a process of transmitting the downlink control information and the downlink data. For example, the transmission processing unit 211 encodes the downlink control information and the downlink data input from the control unit 23 using an encoding method such as block encoding, convolutional encoding, turbo encoding, or the like. Here, the encoding may be performed by polar code encoding or low density parity check code (LDPC code) encoding. Then, the transmission processing unit 211 modulates the encoded bits by a predetermined modulation method such as BPSK, QPSK, 16 QAM, 64 QAM, or 256 QAM. In this case, the signal points on the constellation do not necessarily have to be equidistant. The constellation may be a non-uniform constellation (NUC). Then, the transmission processing unit 211 multiplexes the modulation symbol of each channel and the downlink reference signal and arranges the multiplexed symbols in a predetermined resource element. Then, the transmission processing unit 211 performs various types of signal processing on the multiplexed signal. For example, the transmission processing unit 211 performs processing such as conversion into a frequency domain by fast Fourier transform, addition of a guard interval (cyclic prefix), generation of a baseband digital signal, conversion into an analog signal, quadrature modulation, up-conversion, removal of an extra frequency component, and amplification of power. The signal generated by the transmission processing unit 211 is transmitted from the antenna 213.

The reception processing unit 212 processes the uplink signal received via the antenna 213. For example, the reception processing unit 212 performs down-conversion, removal of an unnecessary frequency component, control of an amplification level, quadrature demodulation, conversion into a digital signal, removal of a guard interval (cyclic prefix), extraction of a frequency domain signal by fast Fourier transform, and the like on the uplink signal. Then, the reception processing unit 212 separates an uplink channel, such as a physical uplink shared channel (PUSCH) and a physical uplink control channel (PUCCH), and an uplink reference signal from the signals subjected to these processes. Further, the reception processing unit 212 demodulates the received signal using a modulation scheme such as binary phase shift keying (BPSK) or quadrature phase shift keying (QPSK) with respect to the modulation symbol of the uplink channel. The modulation scheme used for demodulation may be 16 quadrature amplitude modulation (QAM), 64 QAM, or 256 QAM. In this case, the signal points on the constellation do not necessarily have to be equidistant. The constellation may be a non-uniform constellation (NUC). Then, the reception processing unit 212 performs decoding processing on the demodulated encoded bits of the uplink channel. The decoded uplink data and uplink control information are output to the control unit 23.

The antenna 213 is an antenna device (antenna unit) that mutually converts a current and a radio wave. The antenna 213 may include one antenna element (for example, one patch antenna) or may include a plurality of antenna elements (for example, a plurality of patch antennas). In a case where the antenna 213 includes a plurality of antenna elements, the wireless communication unit 21 may be configured to be beamformable. For example, the wireless communication unit 21 may be configured to generate a directional beam by controlling the directivity of a wireless signal using a plurality of antenna elements. Note that the antenna 213 may be a dual-polarized antenna. When the antenna 213 is a dual-polarized antenna, the wireless communication unit 21 may use vertically polarized waves (V-polarized waves) and horizontally polarized waves (H-polarized waves) in transmitting wireless signals. Then, the wireless communication unit 21 may control the directivity of the wireless signal transmitted using the vertically polarized wave and the horizontally polarized wave. Furthermore, the wireless communication unit 21 may transmit and receive spatially multiplexed signals via a plurality of layers including a plurality of antenna elements.

The storage unit 22 is a storage device capable of reading and writing data, such as a DRAM, an SRAM, a flash memory, or a hard disk. The storage unit 22 functions as a storage unit of the base station 20.

The control unit 23 is a controller that controls each unit of the base station 20. The control unit 23 is implemented by, for example, a processor such as a central processing unit (CPU), a micro processing unit (MPU), or the like. For example, the control unit 23 is implemented by the processor executing various programs stored in the storage device inside the base station 20 using a random access memory (RA) or the like as a work region. Note that the control unit 23 may be implemented by an integrated circuit such as an application specific integrated circuit (ASIC) or a field programmable gate array (FPGA). Any of the CPU, the MPU, the ASIC, and the FPGA can be regarded as a controller. Furthermore, the control unit 23 may be implemented by a graphics processing unit (GPU) in addition to or instead of the CPU.

The control unit 23 includes a discriminator 231, a generator 232, a distributor 233, a transmitter 234, a receiver 235, and a decoder 236. Each block (the discriminator 231 to the decoder 236) constituting the control unit 23 is a functional block indicating a function of the control unit 23. These functional blocks may be software blocks or hardware blocks. For example, each of the functional blocks described above may be one software module implemented by software (including microprograms), or may be one circuit block on a semiconductor chip (die). Of course, each functional block may be one processor or one integrated circuit. The control unit 23 may be configured by a functional unit different from the above-described functional block. A configuration method of the functional block is arbitrary. Note that the operation of the control unit 23 may be the same as the operation of each block of the control unit of the terminal device 40.

In some embodiments, the concept of a base station may consist of a collection of a plurality of physical or logical devices. For example, in the present embodiment, the base station may be distinguished into a plurality of devices such as a baseband unit (BBU) and a radio unit (RU). Then, the base station may be interpreted as an assembly of the plurality of devices. In addition, the base station may be either or both of a BBU and an RU. The BBU and the RU may be connected by a predetermined interface (for example, enhanced Common Public Radio Interface (eC-PRI). The RU may be paraphrased as a Remote Radio Unit (RRU) or a Radio DoT (RD). Furthermore, the RU may correspond to a gNB Distributed Unit (gNB-DU) described below. Further, the BBU may correspond to a gNB Central Unit (gNB-CU) described below. Alternatively, the RU may be a wireless device connected to a gNB-DU described below. The RU connected to the gNB-CU, the gNB-DU, and the gNB-DU may be configured to conform to an open radio access network (O-RAN). Further, the RU may be a device integrally formed with the antenna. An antenna (for example, an antenna integrally formed with an RU) included in the base station may adopt an Advanced Antenna System and support MIMO (for example, FD-MIMO) or beamforming. Furthermore, the antenna included in the base station may include, for example, 64 transmission antenna ports and 64 reception antenna ports.

In addition, the antenna mounted on the RU may be an antenna panel including one or more antenna elements, and the RU may be mounted with one or more antenna panels. For example, the RU may be mounted with two antenna panels of a horizontally polarized antenna panel and a vertically polarized antenna panel, or two antenna panels of a clockwise circularly polarized antenna panel and a counterclockwise circularly polarized antenna panel. In addition, the RU may form and control an independent beam for each antenna panel.

Note that a plurality of base stations may be connected to each other. The one or the plurality of base stations may be included in a radio access network (RAN). In this case, the base station may be simply referred to as a PAN, a PAN node, an access network (AN), or an AN node. Note that the PAN in LTE is sometimes referred to as an enhanced universal terrestrial PAN (EUTRAN). In addition, the PAN in the NR may be referred to as NGRAN. In addition, the RAN in W-CDMA (UMTS) may be referred to as UTRAN.

Note that an LTE base station may be referred to as an evolved node B (eNodeB) or an eNB. At this time, the EUTRAN includes one or a plurality of eNodeBs (eNBs). Further, an NR base station may be referred to as a gNodeB or a gNB. At this time, the NGRAN includes one or a plurality of gNBs. The EUTRAN may include a gNB (en-gNB) connected to a core network (EPC) in an LTE communication system (EPS). Similarly, the NGRAN may include an ng-eNB connected to a core network 5GC in a 5G communications system (5GS).

When the base station is an eNB, a gNB, or the like, the base station may be referred to as 3GPP access. In addition, when the base station is a wireless access point, the base station may be referred to as non-3GPP access (Non-3GPP Access). Furthermore, the base station may be an optical extension device called a remote radio head (RRH) or a radio unit (RU). Furthermore, in a case where the base station is a gNB, the base station may be a combination of the gNB-CU and the gNB-DU described above, or may be any one of the gNB-CU and the gNB-DU.

Here, the gNB-CU hosts a plurality of upper layers (for example, Radio Resource Control (RRC), Service Data Adaptation Protocol (SDAP), and Packet Data Convergence Protocol (PDCP)) in an access stratum for communication with the UE. On the other hand, the gNB-DU hosts a plurality of lower layers (for example, radio link control (RLC), medium access control (MAC), and physical layer (PHY)) in an access stratum. That is, among messages/information to be described below, RRC signaling (semi-static notification) may be generated by the gNB-CU, while MAC CE and DCI (dynamic notification) may be generated by the gNB-DU. Alternatively, in the RRC configuration (semi-static notification), for example, some configurations such as IE:cellGroupConfig may be generated by the gNB-DU, and the remaining configurations may be generated by the gNB-CU. These configurations may be transmitted and received through an F1 interface described below.

Note that the base station may be configured to be able to communicate with another base station. For example, when a plurality of base stations are eNB or a combination of an eNB and an en-gNB, the base stations may be connected by an X2 interface. Furthermore, in a case where a plurality of base stations are gNB or a combination of a gn-eNB and a gNB, the devices may be connected by an Xn interface. Furthermore, in a case where a plurality of base stations is a combination of the gNB-CU and the gNB-DU, the devices may be connected by the above-described F1 interface. A message/information (for example, RRC signaling, MAC control element (MAC CE), or DCI) to be described below may be transmitted between a plurality of base stations, for example, via an X2 interface, an Xn interface, or an F1 interface.

A cell provided by the base station may be referred to as a serving cell. The concept of the serving cell includes a primary cell (PCell) and a secondary cell (SCell). When dual connectivity is configured for a UE (for example, the terminal device 40), the PCell provided by the MN (Master Node) and zero or one or more SCells may be referred to as a Master Cell Group. Examples of dual connectivity include EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity.

The serving cell may include a PSCell (Primary Secondary Cell or Primary SCG Cell). When dual connectivity is configured for the UE, the PSCell provided by the SN (Secondary Node) and zero or one or more SCells may be referred to as Secondary Cell Group (SCG). Unless specially configured (for example, PUCCH on SCell), the physical uplink control channel (PUCCH) is transmitted in the PCell and the PSCell, but is not transmitted in the SCell. In addition, a radio link failure is also detected in the PCell and the PSCell, but is not detected in the SCell (does not have to be detected). As described above, since the PCell and the PSCell have a special role in the serving cell, they are also referred to as SpCell (Special Cell).

One downlink component carrier and one uplink component carrier may be associated with one cell. In addition, the system bandwidth corresponding to one cell may be divided into a plurality of bandwidth parts (BWPs). In this case, one or a plurality of BWPs may be configured for the UE, and one BWP may be used for the UE as an active BWP (Active BWP). Furthermore, radio resources (for example, a frequency band, a numerology (subcarrier spacing), and a slot configuration) that can be used by the terminal device 40 may be different for each cell, each component carrier, or each BWP.

<2-4. Configuration of Relay Station>

Next, a configuration of the relay station 30 will be described.

The relay station 30 is a device serving as a relay station of the base station. The relay station 30 is a type of the base station. The relay station 30 is a type of information processing apparatus. The relay station may be referred to as a relay base station. Furthermore, the relay station 30 may be a device called a repeater (e.g., RF Repeater, Smart Repeater, Intelligent Surface).

The relay station 30 can perform wireless communication such as NOMA communication with the terminal device 40. The relay station 30 relays communication between the base station 20 and the terminal device 40. Note that the relay station 30 may be configured to be able to wirelessly communicate with the other relay station 30 and the base station 20. The relay station 30 may be a ground station device or a non-ground station device. The relay station 30 constitutes a radio access network RAN together with the base station 20.

Note that the relay station of the present embodiment may be a fixed device, a movable device, or a floating device. In addition, the size of the coverage of the relay station of the present embodiment is not limited to a specific size. For example, the cell covered by the relay station may be a macro cell, a micro cell, or a small cell.

In addition, the relay station of the present embodiment is not limited to the mounted device as long as the function of relay is satisfied. For example, the relay may be mounted on a terminal device such as a smartphone, may be mounted on an automobile, a train, or a human-powered vehicle, may be mounted on a balloon, an airplane, or a drone, may be mounted on a traffic light, a sign, a street light, or the like, or may be mounted on a home appliance such as a television, a game machine, an air conditioner, a refrigerator, or a lighting fixture.

In addition, the configuration of the relay station 30 may be similar to the configuration of the base station 20 described above. For example, similarly to the base station 20 described above, the relay station 30 may be a device installed in a moving object or may be a moving object itself. As described above, the moving object may be a mobile terminal such as a smartphone or a mobile phone. In addition, the moving object may be a moving object that moves on land (on the ground in a narrow sense) or may be a moving object that moves underground. Of course, the moving object may be a moving object that moves on water or may be a moving object that moves under water. In addition, the moving object may be a moving object that moves inside the atmosphere or may be a moving object that moves outside the atmosphere. Further, the relay station 30 may be a ground station device or a non-ground station device. At this time, the relay station 30 may be an aircraft station or a satellite station.

Furthermore, the size of the coverage of the relay station 30 may be large such as a macro cell or small such as a pico cell, similarly to the base station 20. Of course, the size of the coverage of the relay station 30 may be extremely small such as a femto cell. In addition, the relay station 30 may have a beamforming capability. In this case, in the relay station 30, a cell or a service area may be formed for each beam.

Figure 7:
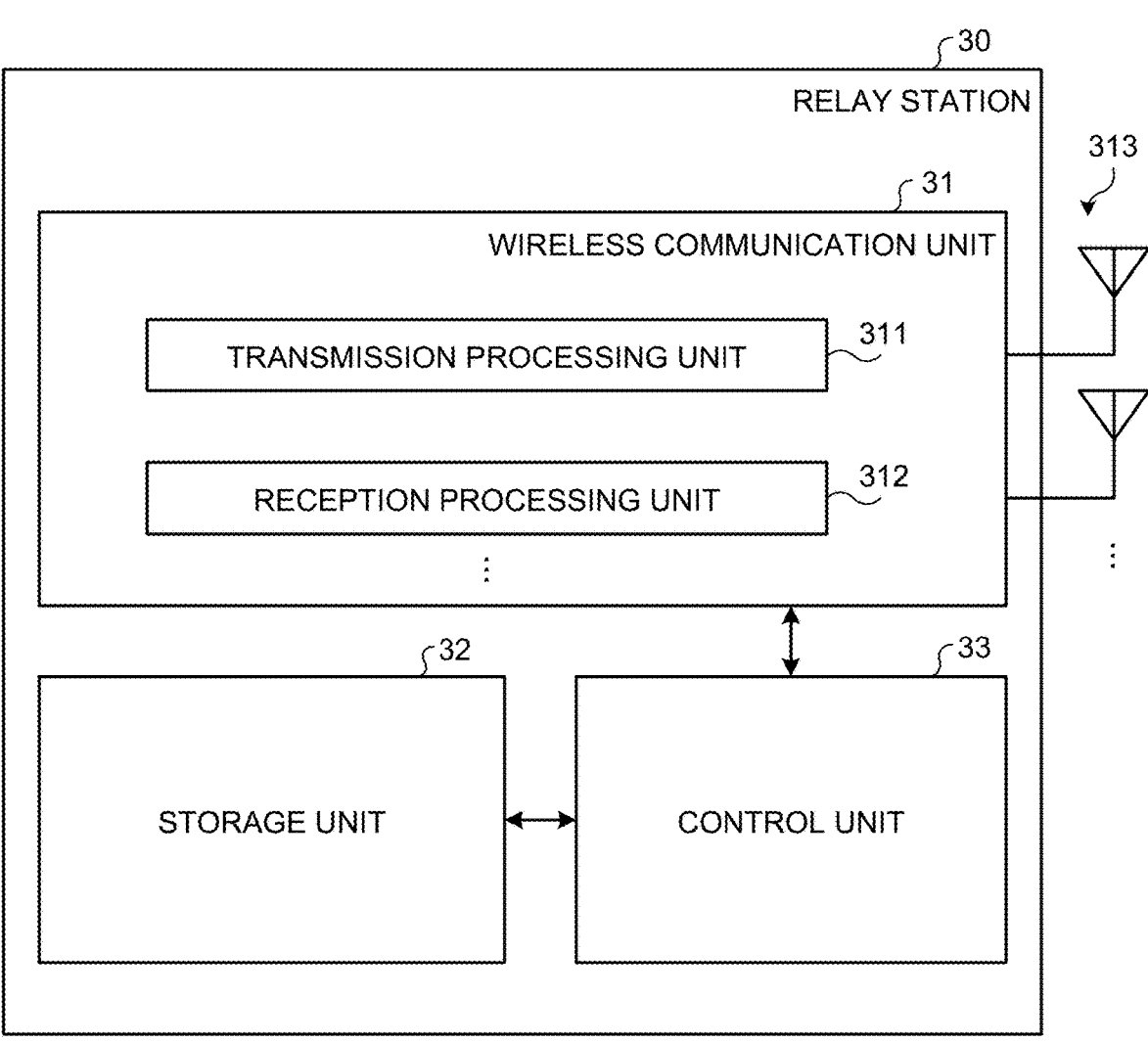
FIG. 7 is a diagram illustrating a configuration example of a relay station according to an embodiment of the present disclosure.

FIG. 7 is a diagram illustrating a configuration example of the relay station 30 according to an embodiment of the present disclosure. The relay station 30 includes a wireless communication unit 31, a storage unit 32, and a control unit 33. Note that the configuration illustrated in FIG. 7 is a functional configuration, and the hardware configuration may be different from this functional configuration. Furthermore, the functions of the relay station 30 may be implemented in a distributed manner in a plurality of physically separated configurations.

The wireless communication unit 31 is a wireless communication interface that wirelessly communicates with other wireless communication apparatuses (for example, the base station 20, the terminal device 40, and another relay station 30). The wireless communication unit 31 corresponds to one or a plurality of wireless access methods. For example, the wireless communication unit 31 supports both NR and LTE. The wireless communication unit 31 may be compatible with W-CDMA or cdma 2000 in addition to NR or LTE. The wireless communication unit 31 includes a transmission processing unit 311, a reception processing unit 312, and an antenna 313. The wireless communication unit 31 includes a plurality of transmission processing units 311, a plurality of reception processing units 312, and a plurality of antennas 313. When the wireless communication unit 31 supports a plurality of wireless access methods, each unit of the wireless communication unit 31 can be configured individually for each wireless access method. For example, the transmission processing unit 311 and the reception processing unit 312 may be individually configured by LTE and NR. The configurations of the transmission processing unit 311, the reception processing unit 312, and the antenna 313 are similar to the configurations of the transmission processing unit 211, the reception processing unit 212, and the antenna 213 described above. Note that the wireless communication unit 31 may be configured to be beamformable similarly to the wireless communication unit 21.

The storage unit 32 is a storage device capable of reading and writing data, such as a DRAM, an SRAM, a flash memory, or a hard disk. The storage unit 32 functions as a storage unit of the relay station 30.

The control unit 33 is a controller that controls each unit of the relay station 30. The control unit 33 is implemented by, for example, a processor such as a CPU, an MPU, or a GPU. For example, the control unit 33 is implemented by the processor executing various programs stored in the storage device inside the relay station 30 using a RAM or the like as a work region. Note that the control unit 33 may be implemented by an integrated circuit such as an ASIC or an FPGA. Any of the CPU, the MPU, the GPU, the ASIC, and the FPGA can be regarded as a controller. The operation of the control unit 33 may be the same as the operation of each block (the discriminator 231 to the decoder 236) of the control unit 23 of the base station 20.

Note that the relay station 30 may be an IAB relay node. The relay station 30 operates as an IAB-MT (Mobile Termination) for an IAB donor node that provides backhaul, and operates as an IAB-DU (Distributed Unit) for a terminal device 40 that provides access. The IAB donor node may be, for example, the base station 20, and operates as an IAB-CU (Central Unit).

<2-5. Configuration of Terminal Device>

Next, a configuration of the terminal device 40 will be described.

The terminal device 40 is a wireless communication apparatus that wirelessly communicates with other communication apparatuses such as the base station 20 and the relay station 30. The terminal device 40 is, for example, a mobile phone, a smart device (smartphone or tablet), a personal digital assistant (PDA), or a personal computer. Furthermore, the terminal device 40 may be a device such as a business camera provided with a communication function, or may be a motorcycle, a mobile relay vehicle, or the like on which a communication apparatus such as a field pickup unit (FPU) is mounted. Furthermore, the terminal device 40 may be a Machine to Machine (M2M) device or an Internet of Things (IoT) device.

Note that the terminal device 40 may be able to perform NOMA communication with the base station 20. Furthermore, the terminal device 40 may be able to use an automatic retransmission technology such as HARQ when communicating with the base station 20. The terminal device 40 may be able to perform sidelink communication with another terminal device 40. The terminal device 40 may also be able to use an automatic retransmission technology such as HARQ when performing sidelink communication. Note that the terminal device 40 may also be capable of NOMA communication in communication (sidelink) with another terminal device 40. Furthermore, the terminal device 40 may be able to perform LPWA communication with another communication apparatus (for example, the base station 20 and another terminal device 40). Furthermore, the wireless communication used by the terminal device 40 may be wireless communication using millimeter waves. Note that the wireless communication (including sidelink communication) used by the terminal device 40 may be wireless communication using radio waves or wireless communication (optical wireless) using infrared rays or visible light.

Furthermore, the terminal device 40 may be a mobile device. The mobile device is a mobile wireless communication apparatus. At this time, the terminal device 40 may be a wireless communication apparatus installed in a moving object or may be a moving object itself. For example, the terminal device 40 may be a vehicle that moves on a road such as an automobile, a bus, a truck, or a motorcycle, a vehicle that moves on a rail installed on a track such as a train, or a wireless communication apparatus mounted on the vehicle. Note that the moving object may be a mobile terminal, or may be a moving object that moves on land (on the ground in a narrow sense), underground, on water, or under water. Furthermore, the moving object may be a moving object that moves inside the atmosphere, such as a drone or a helicopter, or may be a moving object that moves outside the atmosphere, such as an artificial satellite.

The terminal device 40 may be simultaneously connected to a plurality of base stations or a plurality of cells to perform communication. For example, in a case where one base station supports a communication area via a plurality of cells (for example, pCell, sCell), the plurality of cells can be bundled and communicated between the base station 20 and the terminal device 40 by a carrier aggregation (CA) technology, a dual connectivity (DC) technology, or a multi-connectivity (MC) technology. Alternatively, the terminal device 40 and the plurality of base stations 20 can communicate with each other by a Coordinated Multi-Point Transmission and Reception (CoMP) technology via cells of different base stations 20.

Figure 8:
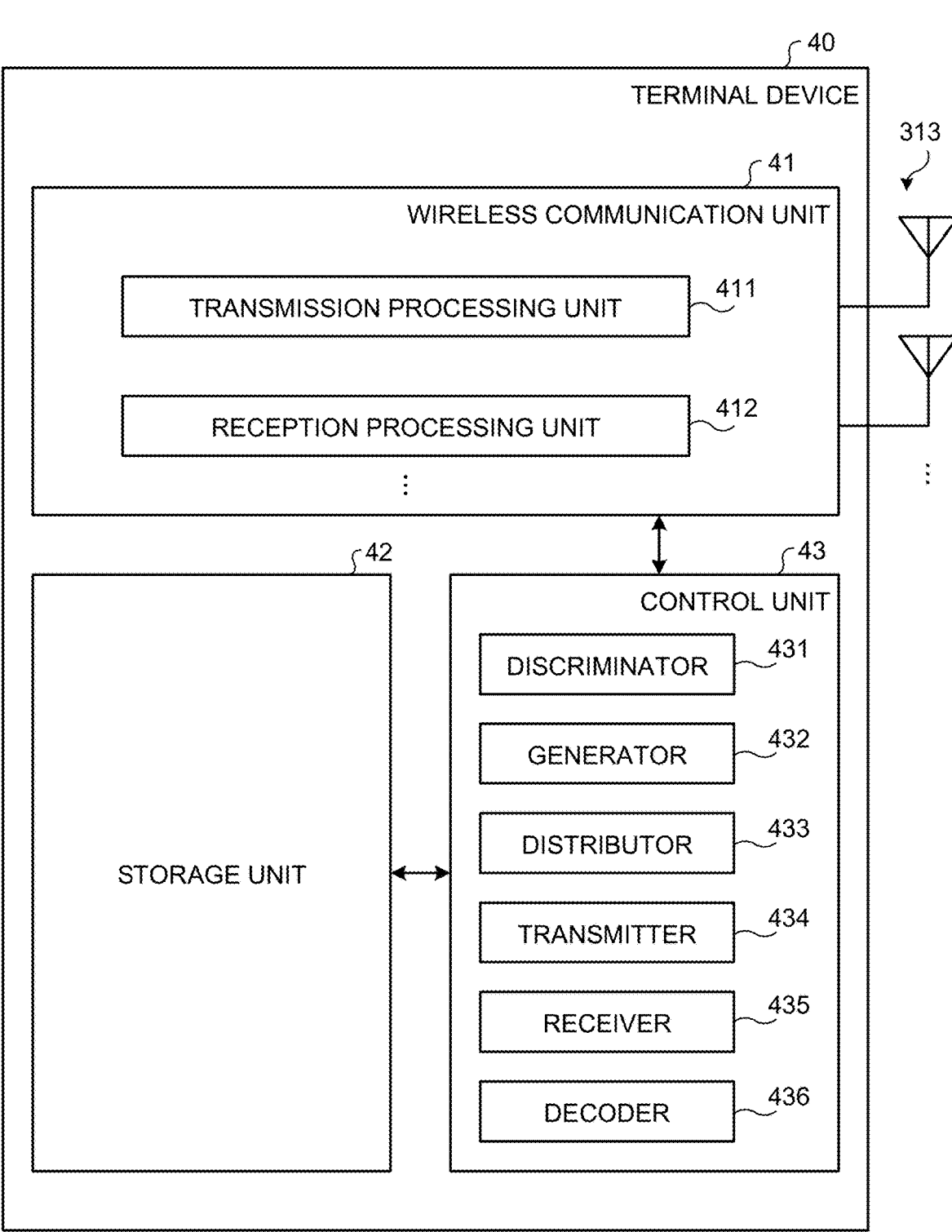
FIG. 8 is a diagram illustrating a configuration example of a terminal device according to an embodiment of the present disclosure.

FIG. 8 is a diagram illustrating a configuration example of the terminal device 40 according to an embodiment of the present disclosure. The terminal device 40 includes a wireless communication unit 41, a storage unit 42, and a control unit 43. Note that the configuration illustrated in FIG. 8 is a functional configuration, and the hardware configuration may be different from this functional configuration. Furthermore, the functions of the terminal device 40 may be implemented in a distributed manner in a plurality of physically separated configurations.

The wireless communication unit 41 is a signal processing unit for wirelessly communicating with other wireless communication apparatuses (for example, the base station 20, the relay station 30, and another terminal device 40). The wireless communication unit 41 operates under the control of the control unit 43. The wireless communication unit 41 includes a transmission processing unit 411, a reception processing unit 412, and an antenna 413. The configurations of the wireless communication unit 41, the transmission processing unit 411, the reception processing unit 412, and the antenna 413 are similar to the configurations of the wireless communication unit 21, the transmission processing unit 211, the reception processing unit 212, and the antenna 213 of the base station 20. Further, the wireless communication unit 41 may be configured to be beamformable similarly to the wireless communication unit 21. Further, similarly to the wireless communication unit 21, the wireless communication unit 41 may be configured to be able to transmit and receive spatially multiplexed signals.

The storage unit 42 is a storage device capable of reading and writing data, such as a DRAM, an SRAM, a flash memory, or a hard disk. The storage unit 42 functions as a storage unit of the terminal device 40.

The control unit 43 is a controller that controls each unit of the terminal device 40. The control unit 43 is implemented by, for example, a processor such as a CPU, an MPU, or the like. For example, the control unit 43 is implemented by the processor executing various programs stored in the storage device inside the terminal device 40 using a RAM or the like as a work region. Note that the control unit 43 may be implemented by an integrated circuit such as an ASIC or an FPGA. Any of the CPU, the MPU, the ASIC, and the FPGA can be regarded as a controller. Furthermore, the control unit 43 may be implemented by a GPU in addition to or instead of the CPU.

The control unit 43 includes a discriminator 431, a generator 432, a distributor 433, a transmitter 434, a receiver 435, and a decoder 436. Each block (the discriminator 431 to the decoder 436) constituting the control unit 43 is a functional block indicating a function of the control unit 43. These functional blocks may be software blocks or hardware blocks. For example, each of the functional blocks described above may be one software module implemented by software (including microprograms), or may be one circuit block on a semiconductor chip (die). Of course, each functional block may be one processor or one integrated circuit. The control unit 43 may be configured by a functional unit different from the above-described functional block. A configuration method of the functional block is arbitrary. The operation of the control unit 43 may be the same as the operation of each block (the discriminator 231 to the decoder 236) of the control unit 23 of the base station 20.

3. Packet Coding

The configuration of the communication system 1 of the present embodiment has been described above. Next, packet coding as a premise of transmission and reception processing of the present embodiment will be described.

<3-1. Overview of Packet Coding>

In the present embodiment, an encoding method for generating a plurality of encoded bit sequences from one information sequence (alternatively, a plurality of bit sequences generated by dividing one information sequence) to be transmitted and received is used. This encoding method is referred to as packet coding in the present embodiment.

Note that, in the following description, a plurality of bit sequences generated by dividing one information sequence may be referred to as a plurality of source bit sequences. Further, in the following description, an encoded bit sequence generated by packet coding may be referred to as an encoded bit sequence or an encoded sequence. Furthermore, in the following description, not only the processing of generating a plurality of encoded bit sequences from one information sequence (alternatively, a plurality of source bit sequences) (encoding processing) but also the processing of generating one information sequence (alternatively, a plurality of source bit sequences) from a plurality of encoded bit sequences (decoding processing) may be referred to as packet coding processing.

Figure 9:
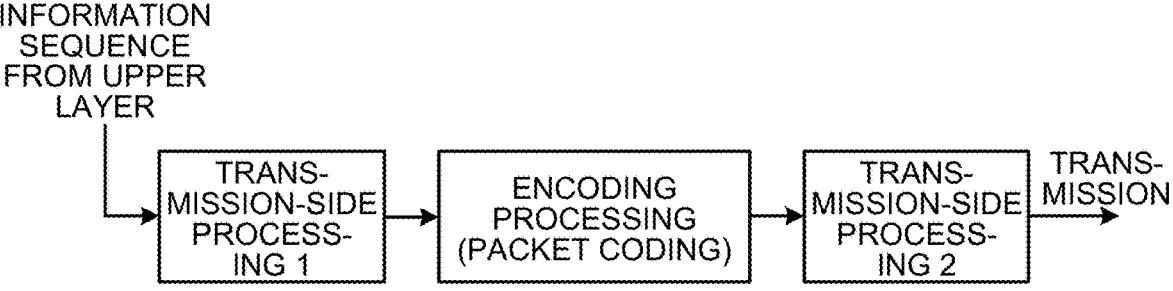
FIG. 9 is a diagram illustrating an overview of packet coding processing executed by a communication apparatus on a transmission side.
Figure 10:
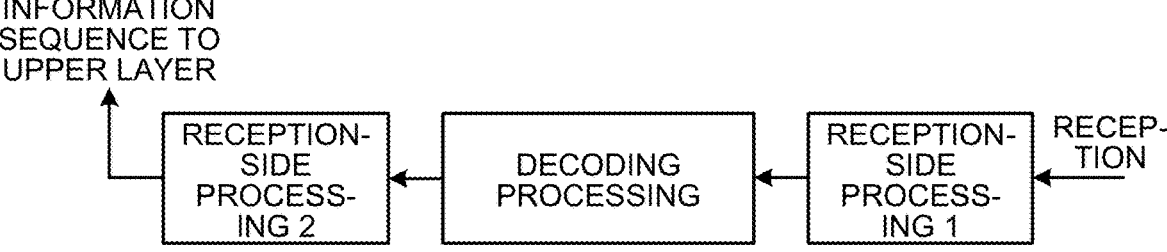
FIG. 10 is a diagram illustrating an overview of packet coding processing executed by a communication apparatus on a reception side.

FIGS. 9 and 10 are diagrams illustrating an overview of packet coding processing. Specifically, FIG. 9 is a diagram illustrating an overview of the packet coding processing executed by the communication apparatus on the transmission side, and FIG. 10 is a diagram illustrating an overview of the packet coding processing executed by the communication apparatus on the reception side. Each of the base station 20, the relay station 30, and the terminal device 40 can be a communication apparatus on the transmission side or the reception side. In the present embodiment, the communication apparatus applies packet coding processing to an information sequence to be transmitted and received.

First, processing on the transmission side will be described with reference to FIG. 9. First, when acquiring an information sequence from an upper layer (for example, an SDAP layer or an RRC layer), a predetermined layer related to signal processing inside the communication apparatus performs predetermined signal processing (transmission-side processing 1 illustrated in FIG. 9) and transmits the information sequence (hereinafter, also referred to as a transmission data sequence) to an encoding layer (for example, the PDCP layer). The encoding layer executes encoding processing on the received transmission data sequence. The encoding processing executed here includes packet coding processing of generating a plurality of encoded bit sequences (hereinafter, also referred to as an encoded sequence) from one transmission data sequence. The encoded sequence undergoes predetermined signal processing (transmission-side processing 2 illustrated in FIG. 9), and then is transmitted to the communication apparatus on the reception side. At this time, a plurality of encoded sequences is distributed to a plurality of channels and transmitted.

Next, processing on the reception side will be described with reference to FIG. 10. First, when acquiring an information sequence (hereinafter, also referred to as a received data sequence) from a communication apparatus on a transmission side, a predetermined layer related to signal processing inside the communication apparatus performs predetermined signal processing (reception-side processing 1 illustrated in FIG. 9) and transmits the received data sequence to a decoding layer (for example, the PDCP layer). The decoding layer performs decoding processing corresponding to the transmission-side encoding processing (packet coding processing) on the received data sequence. The information sequence generated by the decoding processing is transmitted to the upper layer after undergoing predetermined signal processing (reception-side processing 2 illustrated in FIG. 8).

<3-2. Characteristics of Packet Coding>

Next, characteristics of packet coding will be described. Note that the decoding processing executed on the reception side is processing corresponding to the encoding processing (packet coding processing) on the transmission side, and thus description thereof is omitted.

The packet coding processing includes a division procedure of dividing one transmission data sequence into a plurality of source bit sequences, and an encoding procedure of generating a plurality of encoded bit sequences from the plurality of source bit sequences by applying encoding processing according to a predetermined error correction coding scheme to the plurality of source bit sequences. Note that the packet coding processing does not necessarily include the division procedure. Only the encoding procedure may be the packet coding processing.

Figure 11:
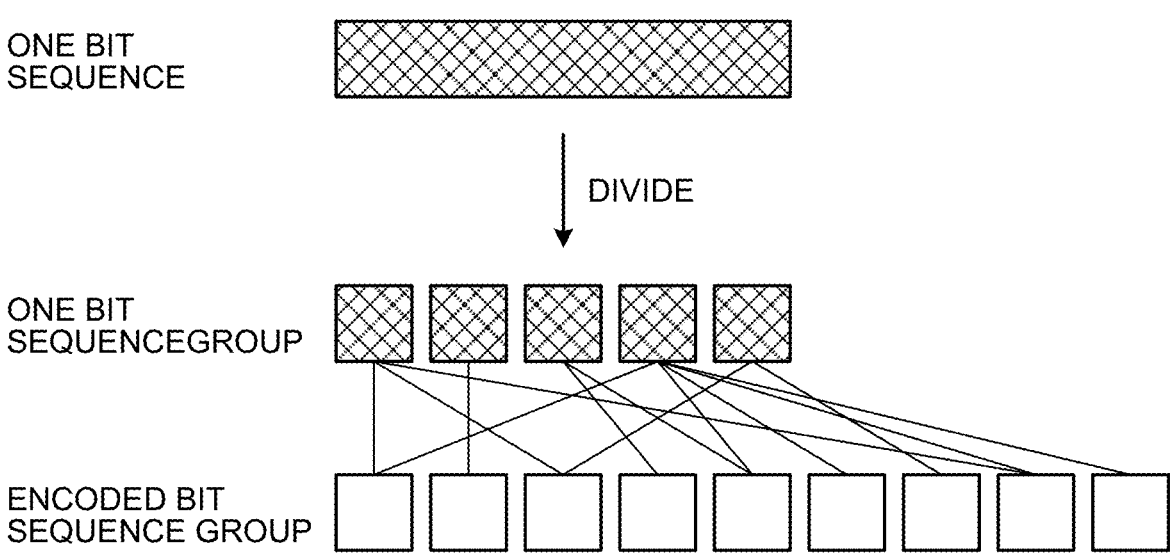
FIG. 11 is a diagram for describing packet coding processing.

FIG. 11 is a diagram for describing packet coding processing. In packet coding, a communication apparatus generates a plurality of source bit sequences from one bit sequence (one transmission data sequence). At this time, the plurality of source bit sequences may have the same length. That is, the communication apparatus may equally divide one bit sequence. Then, the communication apparatus performs predetermined error correction encoding processing on a plurality of source bit sequences (one bit sequence group illustrated in FIG. 11) to generate a plurality of encoded bit sequences (encoded bit sequence group illustrated in FIG. 11) having error correction capability. At this point, the communication apparatus may generate the encoded bit sequence group by performing bit level XOR on the source bit sequences. In this case, the bit sequence length of the parity bit sequence is the same as the sequence length of the plurality of source bit sequences (here, corresponding to one bit sequence group) used for input. In order to succeed in decoding, the communication apparatus on the transmission side needs to transmit, to the reception side, at least the number of encoded bit sequences that are the number (5 in the example of FIG. 11) or more of source bit sequences to be encoded among a plurality of output encoded bit sequences (9 encoded bit sequences in the example of FIG. 11). Note that the example illustrated in FIG. 11 is merely an example. The packet coding processing is not limited to the example illustrated in FIG. 11.

The error correction coding scheme used in the packet coding process is desirably a forward error correction (FEC) scheme included in a category such as Erasure Codes, Rateless Codes, or Fountain Codes. Further, the error correction coding scheme used in the packet coding processing may be a scheme in which a plurality of bit sequences is linearly combined or XOR-combined and encoded. Hereinafter, examples of the error correction coding scheme assumed to be used in the packet coding processing will be described in (A1) to (A11) below. Of course, the error correction coding scheme used in the first encoding processing is not limited to the following example.

(A1) Erasure Codes
(A2) Rateless Codes
(A3) Fountain Codes
(A4) Tornado Codes
(A5) Luby Transform Codes (LT Codes)
(A6) Raptor Codes
(A7) RaptorQ Codes
(A8) Low Density Parity Check Codes (LDPC Codes)
(A9) BCH Codes
(A10) Reed Solomon Codes (RS Codes)
(A11) XOR code (eXclusive OR Codes)

Figure 12:
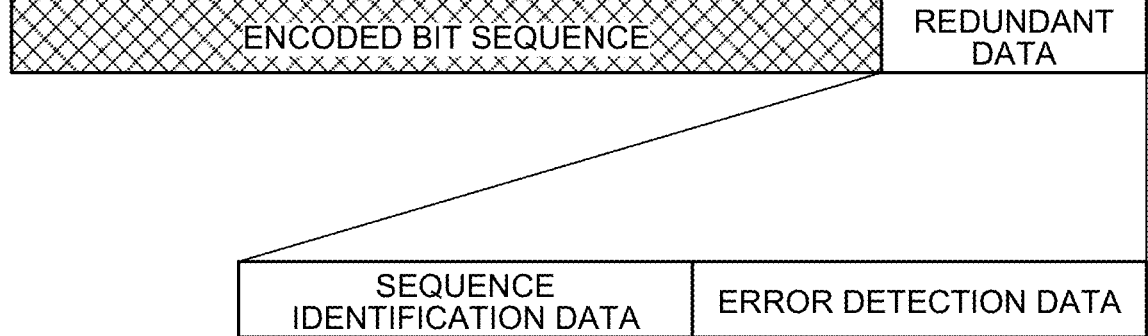
FIG. 12 is a diagram illustrating an example of redundant data assigned to an encoded bit sequence.

A communication apparatus assigns redundant data to a plurality of encoded bit sequences generated by packet coding in units of encoded bit sequences. FIG. 12 is a diagram illustrating an example of redundant data assigned to an encoded bit sequence. In the example of FIG. 12, the redundant data includes sequence identification data having a symbol identification function and error detection data having an error detection function. The sequence identification data is, for example, an identification number for the purpose of identifying an encoded bit sequence. The identification number may be referred to as an identification (ID) or a sequence number (SN). The identification number is used by the communication apparatus on the reception side to determine which encoded sequence on the transmission side the received encoded bit sequence corresponds to. The error detection data is used by the communication apparatus on the reception side to detect whether or not there is an error in the encoded bit sequence. When generating the error detection data, the communication apparatus on the transmission side may further perform encoding processing on the encoded sequence. As an example of further encoding processing, cyclic redundancy check (CRC) is exemplified.

A specific example of the packet coding processing (encoding procedure/decoding procedure) will be described below.

Figure 13:
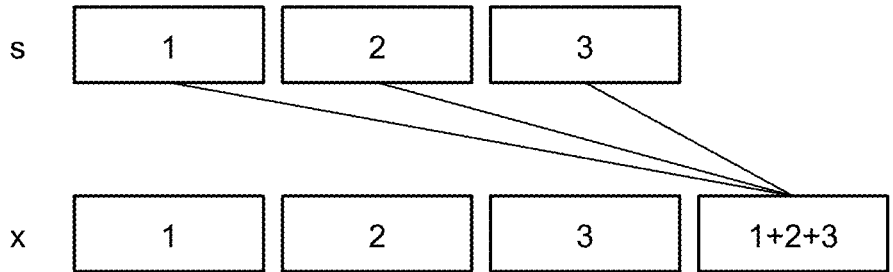
FIG. 13 is a diagram illustrating an example of an encoding procedure of packet coding processing.

FIG. 13 is a diagram illustrating an example of an encoding procedure of packet coding processing. As described above, the encoding procedure of the packet coding processing may be regarded as the packet coding processing itself. Not all the packet coding illustrated in (A1) to (A11) follows the same procedure as that in FIG. 13. FIG. 13 illustrates a process of generating one new parity bit sequence by encoding using one of three bit sequences as an input. In the example of FIG. 13, the parity is generated by using bit-level addition of bit sequences of equal lengths. In this case, the encoding method can be represented by a matrix operation. In the matrix representation of FIG. 13, the matrix on the left part of the right side is an encoding matrix. In the example of FIG. 13, a plurality of bit sequences (components of the 1st to 3rd rows of the matrix) same as the input and a parity bit sequence (components of the 4th row of the matrix) are generated as the encoded bit sequence group.

Figure 14:
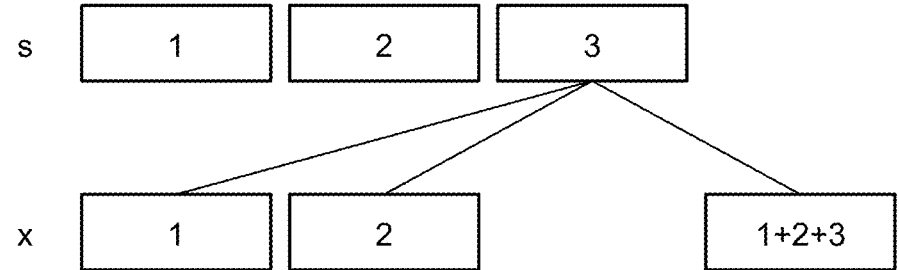
FIG. 14 is a diagram illustrating an example of a coding procedure of a plurality of received encoded bit sequences.

FIG. 14 is a diagram illustrating an example of a coding procedure of a plurality of received encoded bit sequences. Note that the decoding procedure illustrated in FIG. 14 does not correspond to all the packet coding illustrated in (A1) to (A11). FIG. 14 illustrates a state in which correction is performed using a parity bit sequence in a case where one encoded bit sequence at an arbitrary position disappears. Whether or not the lost sequence can be corrected is equal to whether or not the equation can be solved when the matrix constructed with the row components of the encoding matrix corresponding to the correctly arrived encoded bit sequence is regarded as a linear equation.

<3-3. Procedure Example of Packet Coding Processing>

Figure 15:
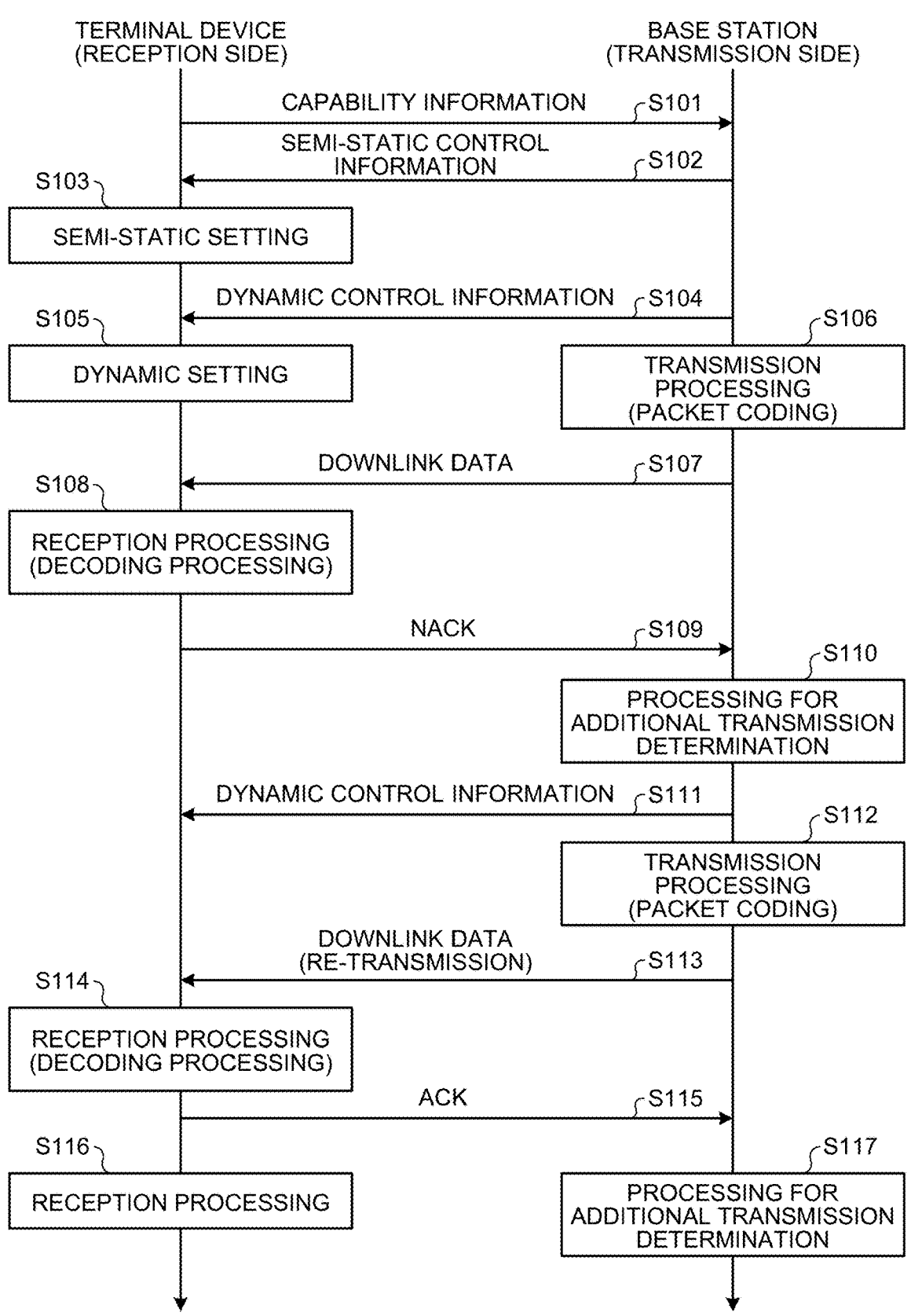
FIG. 15 is a sequence diagram illustrating a procedure example of packet coding processing.

Next, a procedure example of the packet coding processing will be described. FIG. 15 is a sequence diagram illustrating a procedure example of packet coding processing. Note that the procedure example illustrated in FIG. 15 is merely an example, and the procedure of the packet coding processing is not limited to this procedure example. Furthermore, although FIG. 15 illustrates downlink communication from the base station 20 to the terminal device 40, the technology disclosed in the present embodiment is also applicable to other communication (for example, uplink communication from the terminal device 40 to the base station 20). Hereinafter, a procedure example of the packet coding processing of the present embodiment will be described with reference to the sequence diagram of FIG. 15.

First, the terminal device 40 notifies the base station 20 of the cell to which the terminal device is connected of information regarding its own terminal capability (Step S101).

The information also includes capability information for packet coding. The terminal device 40 may provide a notification of the information regarding the terminal capability during a procedure of initial access or after the initial access. Note that, as the physical channel for this notification, for example, at least one of a random access channel (PRACH: Physical Random Access Channel), an uplink control channel (PUCCH: Physical Uplink Control Channel), and an uplink shared channel (PUSCH: Physical Uplink Shared Channel) may be used.

The base station 20 notifies the terminal device 40 connected to the cell managed by the base station itself of semi-static control information including information regarding packet coding (encoding/decoding) (Step S102). The semi-static control information may be cell-specific control information. The base station 20 may provide a notification of the semi-static control information during the procedure of the initial access or after the initial access. Furthermore, the base station 20 may provide a notification of this control information as part of an RRC procedure such as RRC signaling, RRC configuration, or RRC reconfiguration. Furthermore, the base station 20 may periodically notify the terminal device 40 of the control information. At least one of a broadcast channel (PBCH: Physical Broadcast Channel), a downlink control channel (Physical Downlink Control Channel, EPDCCH: Enhanced Physical Downlink Control Channel), and a downlink shared channel (Physical Downlink Shared Channel) may be used as the physical channel for broadcasting the control information.

Upon receiving the semi-static control information, the terminal device 40 performs setting related to encoding on the basis of the information related to packet coding included in the received control information (Step S103).

Thereafter, when downlink communication occurs from the base station 20 to the terminal device 40, the base station 20 transmits dynamic control information to the terminal device 40 (Step S104). Examples of a case where downlink communication occurs include a case where the terminal device 40 requests data download (pull) and a case where push data is generated to the terminal device 40. The dynamic control information may be terminal-specific (UE-specific) control information or terminal-group-specific (UE-group-specific) control information. Here, the terminal group is, for example, a group of one or more terminal devices 40 which are transmission destination targets in a case where the downlink communication is multicast or broadcast.

Note that the dynamic control information can include various types of information such as information regarding a radio resource used to perform downlink communication. For example, the dynamic control information can include, for example, information regarding various resources for allocating downlink communication to the target terminal device 40 (terminal device 40 group). More specifically, the dynamic control information can include, for example, the following information (1) to (9).

(1) Frequency resource (for example, a Resource Block, a Subcarrier, a Subcarrier Group, or the like)

(2) Time resource (for example, a Subframe, a Slot, a Mini-slot, a Symbol, or the like)

(3) Spatial resource (for example, an Antenna, an Antenna Port, a Spatial Layer, a Spatial Stream, or the like)

(4) Non-orthogonal resources (for example, resources related to power, an interleave pattern, a scrambling pattern, a diffusion pattern, and the like) for a given communication (for example, Non-orthogonal Multiple Access (NOMA), Multiuser Superposition Transmission (MUST), Interleave Division Multiple Access (IDMA), Code Division Multiple Access (CDMA), and the like)

(5) Modulation order (6) Encoding method used in packet coding (for example, error correction coding scheme)

(7) Information related to encoding rate of packet coding (8) Information regarding redundant data assigned to encoded sequence (for example, information related to an error detection method and an identification number of an encoded sequence)

(9) ARQ/HARQ setting (for example, NDI (New Data Indicator), RV (Redundancy Version), and the like)

The terminal device 40 that has received the dynamic control information performs setting for preparing for appropriate reception of downlink communication according to the control information (Step S105).

Next, the base station 20 encodes the data of the downlink communication to the terminal device by the packet coding processing so that the information sequence subjected to the transmission processing in the upper layer matches the control information notification of which is provided to the terminal device 40, and performs the transmission processing (including modulation, physical layer coding, and the like) including the physical layer processing (Step S106). The base station 20 transmits the encoded and modulated data to the terminal device 40 as a wireless signal (Step S107).

Upon receiving the data from the base station 20, the terminal device 40 performs various processing (reception processing, demodulation processing, and decoding processing) including the coding processing corresponding to packet coding processing according to the setting specified in the control information (Step S108). For example, the terminal device 40 determines whether or not an error is included in the restored encoded sequence. Then, the terminal device 40 attempts decoding using only the encoded sequence including no error. Thereafter, the terminal device 40 returns ACK or NACK to the base station 20 depending on whether the data decoding is successful or failed. In addition, the terminal device 40 desirably changes the setting (for example, setting ARQ/HARQ processing) of the processing related to the additional transmission depending on whether the data decoding is successful or failed. Note that, in a case where the decoding fails, the terminal device 40 desirably stores the decoding result or the data in the middle of decoding (encoded sequence) in the memory in order to perform retransmission and synthesis including the next received encoded sequence. When the decoding is successful, the terminal device 40 performs processing for data transfer to the upper layer. In the example of FIG. 15, the terminal device 40 has failed in decoding and returns NACK to the base station 20 (Step S109).

The base station 20 executes processing to be performed next according to the response (ACK/NACK) received from the terminal device 40. For example, in a case where a notification of NACK is received, preparation for transmission of an additional information sequence is performed (Step S110). Examples of preparation for this transmission include generation of a new encoded sequence by packet coding, transmission processing necessary for transmission, selection of radio resources, and the like. Note that, in a case where the ACK is received from the terminal device 40, it means that the target data has been sent and received without any problems, and thus, the process shifts to communication of next new data.

The base station 20 proceeds to perform retransmission or downlink communication of new data according to the process for additional transmission corresponding to the above response (ACK/NACK). For this purpose, the base station 20 broadcasts the target terminal device 40 of the dynamic control information again, and executes the downlink communication according to the setting.

In the example of FIG. 13, since NACK is received from the terminal device 40 (Step S109), the base station 20 executes processing for determining additional transmission (Step S110) and again broadcasts dynamic control information to the terminal device 40 (Step S111). The terminal device 40 that has received the dynamic control information performs setting for preparing for appropriate reception of downlink communication according to the control information. The base station 20 performs various types of processing including packet coding processing on the data of the downlink communication to the terminal device 40 so as to match the control information broadcasted to the terminal device 40 (Step S112). Then, the base station 20 retransmits the encoded data to the terminal device 40 (Step S113).

The terminal device 40 combines the data based on the retransmission signal, and executes various types of processing (reception processing, demodulation processing, and decoding processing) including the coding processing corresponding to the packet coding processing on the combined data according to the setting specified in the control information (Step S114). In the example of FIG. 13, the terminal device 40 has been successfully decoded here, returns ACK to the base station 20 (Step S115), and executes the remaining reception processing (Step S116).

Upon receiving ACK, the base station 20 performs a process for determining additional transmission (Step S117) and shifts to communication of next new data.

4. Operation of Communication System

The packet coding as a premise of the transmission and reception processing of the present embodiment has been described above. Next, the operation (transmission and reception processing) of the communication system 1 of the present embodiment will be described.

Although the introduction of PDCP duplication improves communication reliability, frequency utilization efficiency is significantly reduced because the same data will be transmitted on a plurality of channels. By introducing packet coding, it is possible to maintain the communication reliability while suppressing a decrease in frequency utilization efficiency. However, the above-mentioned literature (for example, Non Patent Literature 2 (3GPP RWS-210368), Non Patent Literature 3 (3GPP RWS-210028), and Non Patent Literature 4 (3GPP RWS-210484)) does not define any method for implementing packet coding. For example, there is no specific procedure or signaling for the communication apparatus to use packet coding. A specific method for introducing packet coding is described below.

<4-1. Basic Procedure>

Next, a procedure of transmission and reception processing of the present embodiment will be described. The following description describes a method of implementing packet coding at the PDCP layer.

<4-1-1. Transmission Processing>

Figure 16:
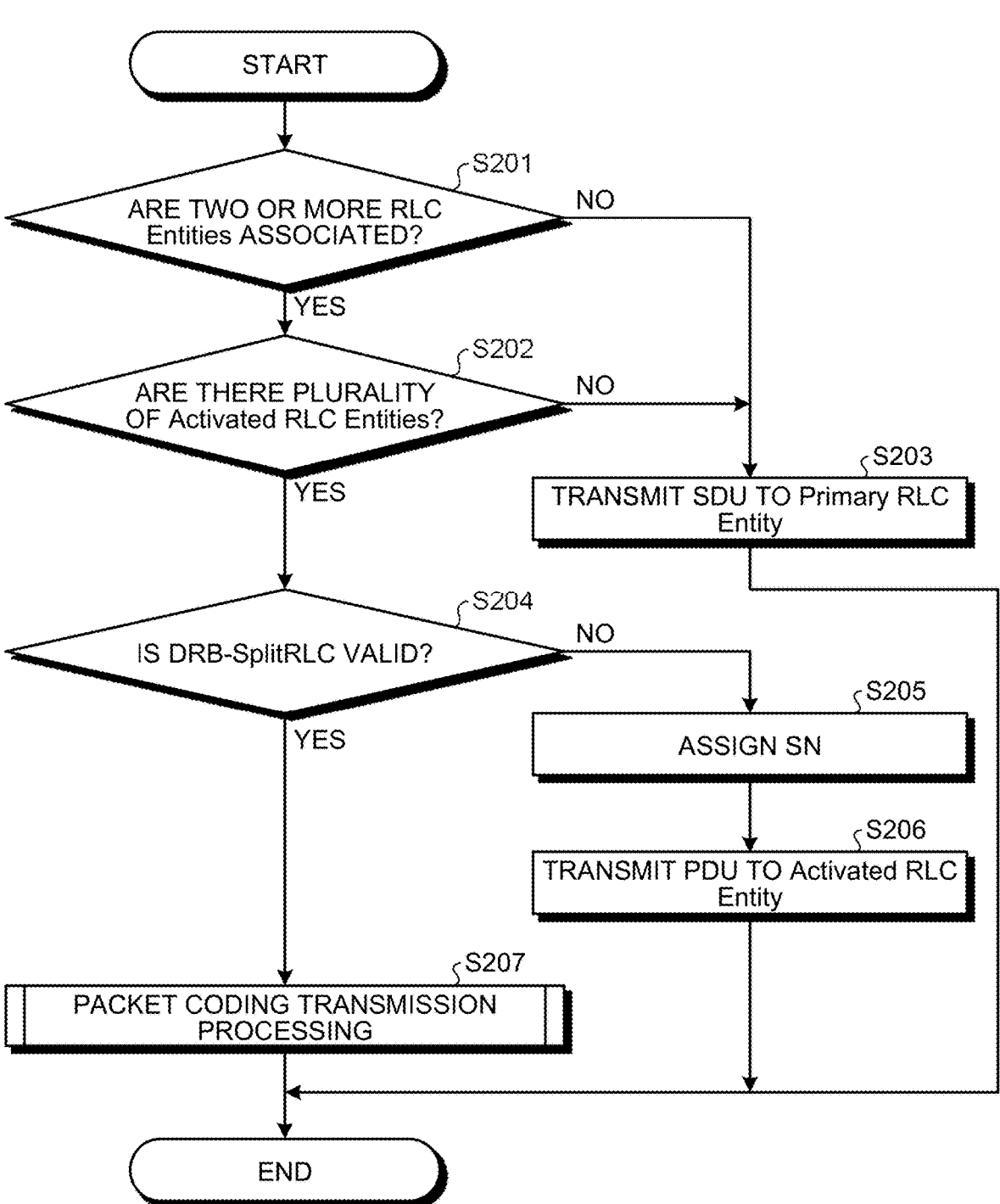
FIG. 16 is a flowchart illustrating transmission processing according to the present embodiment.

First, transmission processing will be described. FIG. 16 is a flowchart illustrating transmission processing according to the present embodiment. The following processing is executed by the control unit (for example, the control unit 23 of the base station 20 or the control unit 43 of the terminal device 40) of the communication apparatus on the transmission side. Note that the communication apparatus on the transmission side is not limited to the base station 20 and the terminal device 40, and may be, for example, the relay station 30. In the following description, a communication apparatus on the transmission side may be referred to as a transmission apparatus.

In the following description, a bit sequence to which a sequence number (SN) is assigned among bit sequences handled in the PDCP is referred to as a PDCP SDU or a PDCP sequence. FIG. 16 illustrates processing from when processing up to Ciphering and Integrity Protection is performed on the PDCP SDU to when the PDC PDU generated by the PDCP entity is transmitted to the RLC entity associated with the PDCP entity in a predetermined transmission process (for example, a transmission process defined in Non-Patent Literature 1 (3GPP TS 38.323 v16.3.0)). Hereinafter, the transmission processing of the present embodiment will be described with reference to the flowchart of FIG. 16.

First, the discriminator (for example, the discriminator 231 of the base station 20 or the discriminator 431 of the terminal device 40) of the transmission apparatus determines whether two or more RLC entities are associated with the PDCP entity (Step S201). When two or more RLC entities are not associated with the PDCP entity (Step S201: No), the processing proceeds to Step S203. Note that the present approach is an alternative approach to the PDCP duplication. Therefore, when two or more RLC entities are not associated with the PDCP entity, it is desirable to perform the transmission processing by the method defined in Non-Patent Literature 1 (3GPP TS 38.323 v16.3.0). The setting related to the association is preferably in accordance with Non-Patent Literature 1 (3GPP TS 38.323 v16.3.0) or other standards defined in 3GPP.

When two or more RLC entities are associated with the PDCP entity (Step S202), the discriminator of the transmission apparatus determines whether a plurality of RLC entities can be used for data transmission using packet coding (Step S202). That is, the discriminator of the transmission apparatus determines whether or not data can be transmitted to a single transmission destination using a plurality of channels (a plurality of independent paths). In the following description, An RLC entity that can be used to transmit data using packet coding is called an activated RLC entity (Activated RLC Entity). Note that the valid RLC entity can be rephrased as a valid channel.

Each RLC entity preferably individually has a variable indicating whether the RLC entity can be used for data transmission using packet coding. In the following description, it is defined as RLC-PacketCoding. Here, RLC-PacketCoding is a variable that handles binary values of TRUE/FALSE. It is desirable that the discriminator of the transmission apparatus checks the value (TRUE/FALSE) of RLC-PacketCoding of each RLC entity associated with the PDCP entity to determine whether or not the entity can be used for data transmission using packet coding. Note that RLC-PacketCoding may be defined at the time of establishment and re-establishment of the RLC entity. In addition, the value of RLC-PacketCoding may be controlled by RRC signaling. In addition, the value of RLC-PacketCoding may be controlled in conjunction with some variable of a radio bearer (RB) or a PDCP entity. The RLC-PacketCoding definition technique is not limited to the above.

In a case where two or more RLC entities are not associated with the PDCP entity (Step S201: No), or in a case where there is no plurality of valid RLC entities (Step S202: No), the transmitter (for example, the transmitter 234 of the base station 20 or the transmitter 434 of the terminal device 40) of the transmission apparatus assigns a Sequence Number (SN) to the PDCP SDU, and transmits the PDCP SDU to which the SN is assigned to the primary RLC entity (Step S203).

When there are a plurality of valid RLC entities (Step S202: Yes), the discriminator of the transmission apparatus determines whether a data radio bearer (DRB) used for data transmission corresponds to a transmission method by packet coding (Step S204). The discriminator can determine whether the DRB supports a transmission method by packet coding using various methods. For example, the DRB used for data transmission may be associated with bearer information indicating whether packet coding can be used for data transmission. Then, the discriminator determines whether or not to perform packet coding on the basis of the bearer information. In the following description, it is assumed that the bearer information is a variable called DRB-SplitRLC having TRUE/FALSE. Note that the bearer information is not limited to DRB-SplitRLC.

The value of the DRB-SplitRLC may be set when the DRB is established (Establishment) and re-established (Re-establishment). In addition, the value of DRB-SplitRLC may be set by a request of another entity (for example, a PDCP entity). Furthermore, the value of the DRB-SplitRLC may be controlled by RRC signaling, or may be controlled in conjunction with some variable of the RLC entity or the PDCP entity. In addition, the DRB-SplitRLC may be defined from what is defined in a layer higher than the PDCP layer such as 5QI. The definition technique of DRB-SplitRLC is not limited to the above.

When DRB-SplitRLC is FALSE (Step S204: No), that is, when a plurality of channels can be used for single communication but packet coding is not performed, the transmitter of the transmission apparatus executes data transmission so as to maximize frequency utilization efficiency. For example, the transmitter assigns a sequence number (SN) to the PDCP PDU (Step S205). Then, the transmitter allocates one or a plurality of PDCP PDUs having a single transmission destination to each valid RLC entity (Activated RLC Entity) and transmits the PDCP PDUs (Step S206). At this time, the transmitter may allocate an SN to the PDCP SDU allocated to each RLC entity so that the SN of the same value is not used at least between these RLC entities.

When the PDCP SDU is allocated to the valid RLC entity, it is desirable that the RLC entity that may be allocated does not perform transmission and reception processing of other PDCP PDUs. However, even if not, the method exemplified in the present embodiment is not affected. For this transmission approach, given that the sizes of the PDCP PDUs are the same between the PDUs, the throughput of the communication as seen at the PDCP layer achieves several times the throughput of a valid RLC entity compared to the case of performing communication using only a single RLC entity.

Figure 17:
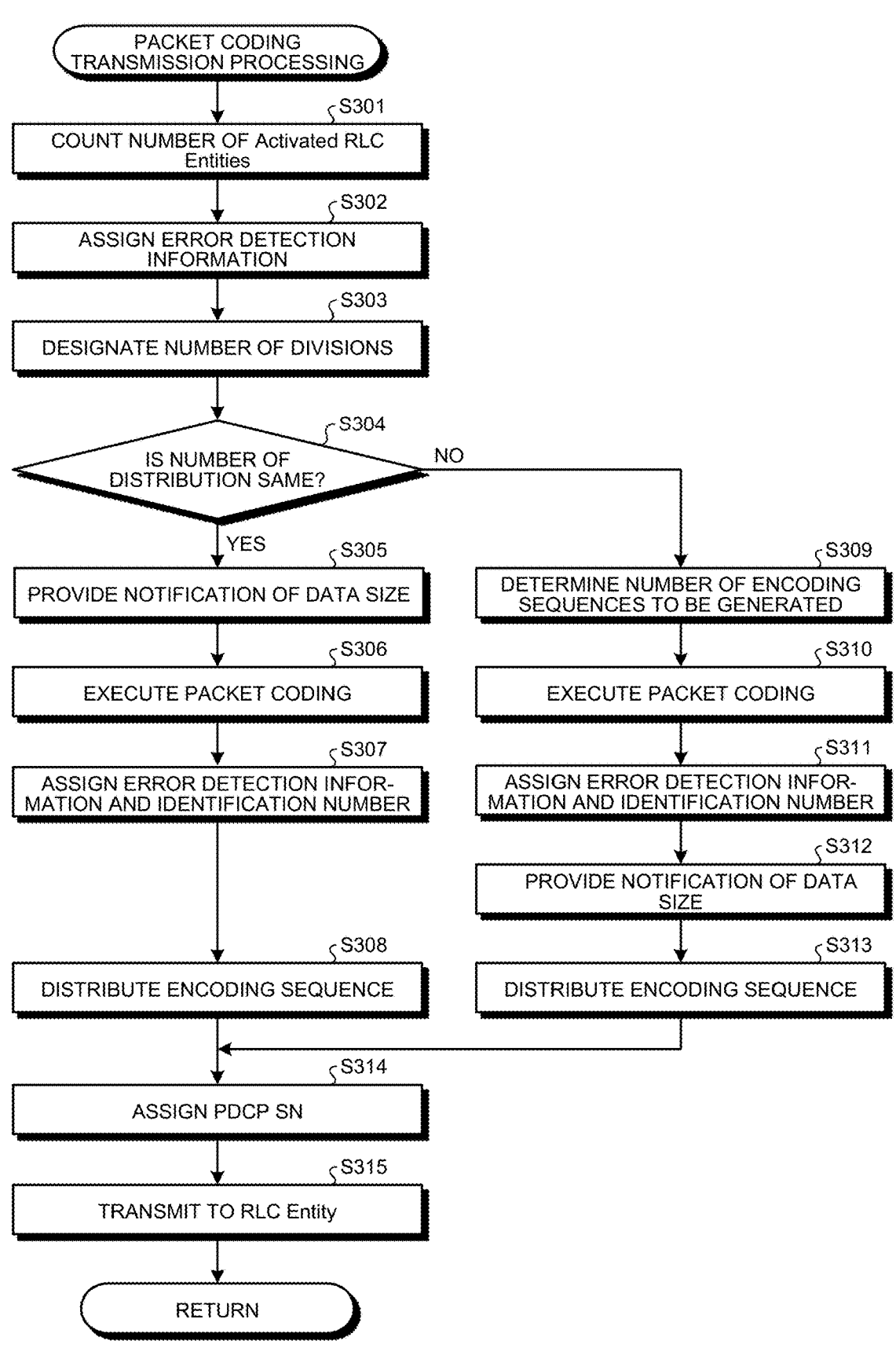
FIG. 17 is a flowchart illustrating packet coding transmission processing.

When DRB-SplitRLC is TRUE (Step S204: No), the control unit of the transmission apparatus performs packet coding transmission processing (Step S207). FIG. 17 is a flowchart illustrating packet coding transmission processing. Hereinafter, the packet coding transmission processing will be described with reference to the flowchart of FIG. 17.

First, the generator (for example, the generator 232 of the base station 20 or the generator 432 of the terminal device 40) of the transmission apparatus detects the number of valid RLC entities (Activated RLC Entity) (Step S301). This number is equal to the number of RLC entities that are associated with the PDCP entity and whose RLC-Packet-Coding is TRUE. The generator desirably detects the number of valid RLC entities by checking RLC-PacketCoding of each RLC entity associated with the PDCP entity. The method for detecting the number of valid RLC entities is not limited to the above method.

Thereafter, the generator of the transmission apparatus assigns error detection information to the PDCP SDU (Step S302). The error detection information (hereinafter, referred to as error detection data.) is information for enabling the reception side to determine whether an error is included in the sequence in units of PDCP SDUs. The error detection data may be, for example, a parity bit sequence generated by performing predetermined encoding processing (for example, CRC) on the PDCP SDU. Note that the error detection data is not limited to the parity bit sequence.

The generator of the transmission apparatus designates the number of divisions when one PDCP SDU (one transmission data sequence) to which the error detection data is assigned is divided into a plurality of source bit sequences (Step S303). At this time, the generator may determine the number of divisions of one transmission data sequence on the basis of reliability information (for example, the value of the 5QI set in the DRB) required for transmission of the transmission data sequence. In addition, the generator may determine the number of divisions on the basis of the number of valid RLC entities. Furthermore, the generator may determine the number of divisions of one transmission data sequence on the basis of a notification from another communication apparatus. For example, when the transmission apparatus is the terminal device 40, the number of divisions of one transmission data sequence may be determined on the basis of a notification from the base station 20. In addition, the transmission apparatus may make the determination on the basis of a notification from inside or outside the transmission apparatus, which is made at the time of establishment and re-establishment of the PDCP entity, the DRB, and the RLC entity. In addition, the transmission apparatus may make the determination on the basis of information such as a state of a physical layer channel related to a valid RLC entity (Activated RLC Entity), an MCS, a CQI, and resource allocation.

It is desirable to notify the reception side of the number of divisions from the viewpoint of efficient decoding. This notification may be provided by RRC signaling or may be provided by a PDCD control PDU (PDCP Control PDU). The PDCD control PDU is, for example, a PDCP status report. In the case of a notification by the PDCD control PDU, this notification may be a notification in a form of being added to a format defined as an existing PDCD control PDU, or may be a notification in a newly defined format. Furthermore, the number of divisions may be known on the transmission/reception side on the basis of any specification or table.

After the number of divisions is designated, the discriminator (for example, the discriminator 231 of the base station 20 or the discriminator 431 of the terminal device 40) of the transmission apparatus determines the relationship between the number of encoded sequences generated by packet coding and the number of valid RLC entities. More specifically, the discriminator determines the number of encoded sequences generated by packet coding according to a distribution scheme of a plurality of encoded sequences to a plurality of channels.

First, the discriminator determines a distribution scheme of a plurality of encoded sequences to a plurality of channels (a plurality of valid RLC entities). For example, the discriminator determines whether the distribution scheme of the plurality of encoded sequences is a distribution scheme for the same number of encoded sequences to each valid RLC entity (Step S304). When the distribution numbers are the same, the PDCP entity can notify the MAC entity corresponding to the valid RLC entity of the size of the PDCP PDU, so that a delay derived from upper layers can be reduced. On the other hand, when the distribution numbers are not the same, the encoded sequence can be flexibly distributed to each valid RLC entity, so that efficient transmission can be performed in consideration of the channel state and the like.

When the distribution numbers are the same (Step S304: Yes), the generator of the transmission apparatus sets the number of encoded sequences to a multiple of the number of valid RLC entities. Then, the generator notifies the MAC entity associated with each valid RLC entity of the size of the PDCP PDU (Step S305). The size of the PDCP PDU is determined based on, for example, a size of one encoded sequence and a size of redundant data. Note that the method of providing a notification of the size of the PDCP PDU may be the same as the method defined in 3GPP.

Next, the generator of the transmission apparatus encodes the PDCP SDU to which the error detection data is assigned by packet coding (Step S306). More specifically, the generator divides the PDCP SDU to which the error detection data is assigned into the number designated in Step S303, and generates the number of encoded sequences set in Step S305 from the divided PDCP SDUs. At this time, the transmission apparatus can also generate a larger number of encoded sequences than the set number, extract the set number of encoded sequences therefrom, and transmit the encoded sequences to the reception side. However, in general, the encoding cost has a positive proportional relationship with the number of encoded sequences. That is, as the number of generated encoded sequences increases, the calculation cost increases accordingly. Therefore, the generator desirably generates a set number of encoded sequences.

Next, the generator assigns redundant data (error detection information and an identification number) to each of the plurality of generated encoded sequences (Step S307). The error detection information (hereinafter, referred to as error detection data) is information for enabling the reception side to determine whether an error is included in the sequence. The error detection data may be, for example, a parity bit sequence generated by performing predetermined encoding processing (for example, CRC) on the encoded sequence. Note that the error detection data is not limited to the parity bit sequence. Furthermore, it is desirable that these encoded sequences are numbered so as to identify each encoded sequence. Alternatively, the generator may assign the corresponding row component of the encoding matrix used for generating the encoded sequence to the encoded symbol as redundancy. In a case where numbering for identification is assigned, it is desirable that the encoding matrix is known on the transmission/reception side. Thereafter, the generator assigns the same identification number (for example, the same SN) to each of the plurality of encoded sequences to which the error detection data is assigned. Note that encoded sequences having the same identification number indicate that the PDCP SDUs of the generation sources are the same.

Next, the distributor (for example, the distributor 233 of the base station 20 or the distributor 433 of the terminal device 40) of the transmission apparatus distributes the plurality of encoded sequences to which the redundant data is assigned to the plurality of valid RLC entities (Step S308). At this time, the distributor evenly distributes the encoded sequence to each valid RLC entity. Each of the plurality of encoded sequences is desirably transmitted to the lower layer as a PDCP PDU. However, a plurality of encoded sequences may be concatenated to generate one large PDCP PDU. In this case, after concatenating the encoded sequences, the transmission apparatus needs to notify the MAC entity of the data size of the PDCP again.

Returning to Step S304, when the distribution numbers are not the same, that is, when the number of encoded sequences to be distributed is determined for each of the plurality of valid RLC entities (Step S304: No), the discriminator determines the number of encoded sequences to be generated (Step S309). At this time, the discriminator of the transmission apparatus determines the number of encoded sequences to be generated on the basis of the number of encoded sequences distributed to each of the plurality of valid RLC entities.

The number of encoded sequences distributed to each of the plurality of valid RLC entities is determined by the distributor of the transmission apparatus. At this time, the distributor can determine the number of encoded sequences of each valid RLC entity by using various methods. For example, the distributor may determine the number of encoded sequences distributed to each of the plurality of valid RLC entities on the basis of the data transmission time (for example, the time until the packet arrives at the IAB donor) of each of the plurality of valid RLC entities. Furthermore, the distributor may determine the number of encoded sequences distributed to each of the plurality of valid RLC entities on the basis of the state (for example, MCS, CQI, resource quantity, channel fading) of the physical layer related to each of the plurality of valid RLC entities. In addition, the distributor may determine the number of encoded sequences of each of the plurality of valid RLC entities on the basis of the buffer usage of each of the plurality of valid RLC entities. For example, the distributor may determine the number of encoded sequences of each of the plurality of valid RLC entities on the basis of the buffer usage of the MAC entity related to the valid RLC entity, or may determine the number of encoded sequences of each of the plurality of valid RLC entities on the basis of the usage of the ARQ buffer of the valid RLC entity. In addition, the distributor may determine the number of encoded sequences of each of the plurality of valid RLC entities on the basis of any specification, or may determine the number of encoded sequences of each of the plurality of valid RLC entities on the basis of a notification independently for each of the plurality of RLC entities.

Next, the generator of the transmission apparatus encodes the PDCP SDU to which the error detection data is assigned by packet coding (Step S310). More specifically, the generator divides the PDCP SDU to which the error detection data is assigned into the number designated in Step S303, and generates the number of encoded sequences determined in Step S309 on the basis of the divided PDCP SDUs. The number of encoded sequences generated here is the sum of the number of encoded sequences of each of the plurality of valid RLC entities. At this time, the transmission apparatus can also generate a larger number of encoded sequences than the set number, extract the set number of encoded sequences therefrom, and transmit the encoded sequences to the reception side. However, in general, the encoding cost has a positive proportional relationship with the number of encoded sequences. That is, as the number of generated encoded sequences increases, the calculation cost increases accordingly. Therefore, the generator desirably generates a set number of encoded sequences.

Next, the generator assigns redundant data (error detection information and an identification number) to each of the plurality of generated encoded sequences (Step S311). The error detection information (hereinafter, referred to as error detection data) is information for enabling the reception side to determine whether an error is included in the sequence. The error detection data may be, for example, a parity bit sequence generated by performing predetermined encoding processing (for example, CRC) on the encoded sequence. Note that the error detection data is not limited to the parity bit sequence. Furthermore, it is desirable that these encoded sequences are numbered so as to identify each encoded sequence. Alternatively, the generator may assign the corresponding row component of the encoding matrix used for generating the encoded sequence to the encoded symbol as redundancy. In a case where numbering for identification is assigned, it is desirable that the encoding matrix is known on the transmission/reception side. Thereafter, the generator assigns the same identification number (for example, the same SN) to each of the plurality of encoded sequences to which the error detection data is assigned. Note that encoded sequences having the same identification number indicate that the PDCP SDUs of the generation sources are the same.

Thereafter, the generator notifies the MAC entity associated with each valid RLC entity of the size of the PDCP PDU (Step S312). The size of the PDCP PDU is determined based on, for example, a size of one encoded sequence and a size of redundant data. Note that the method of providing a notification of the size of the PDCP PDU may be the same as the method defined in 3GPP.

Then, the distributor of the transmission apparatus distributes the number of encoded sequences determined in Step S309 to each valid RLC entity (Step S313).

Then, the transmitter (for example, the transmitter 234 of the base station 20 or the transmitter 434 of the terminal device 40) of the transmission apparatus assigns the same PDCP SN to all the encoded sequences (Step S314). Then, the transmitter transmits each encoded sequence as one PDCP PDU to the valid RLC entity (Step S315).

When the transmission is completed, the transmission apparatus returns the processing to the flow of FIG. 16 and completes the transmission processing.

<4-1-2. Reception Processing>

Figure 18:
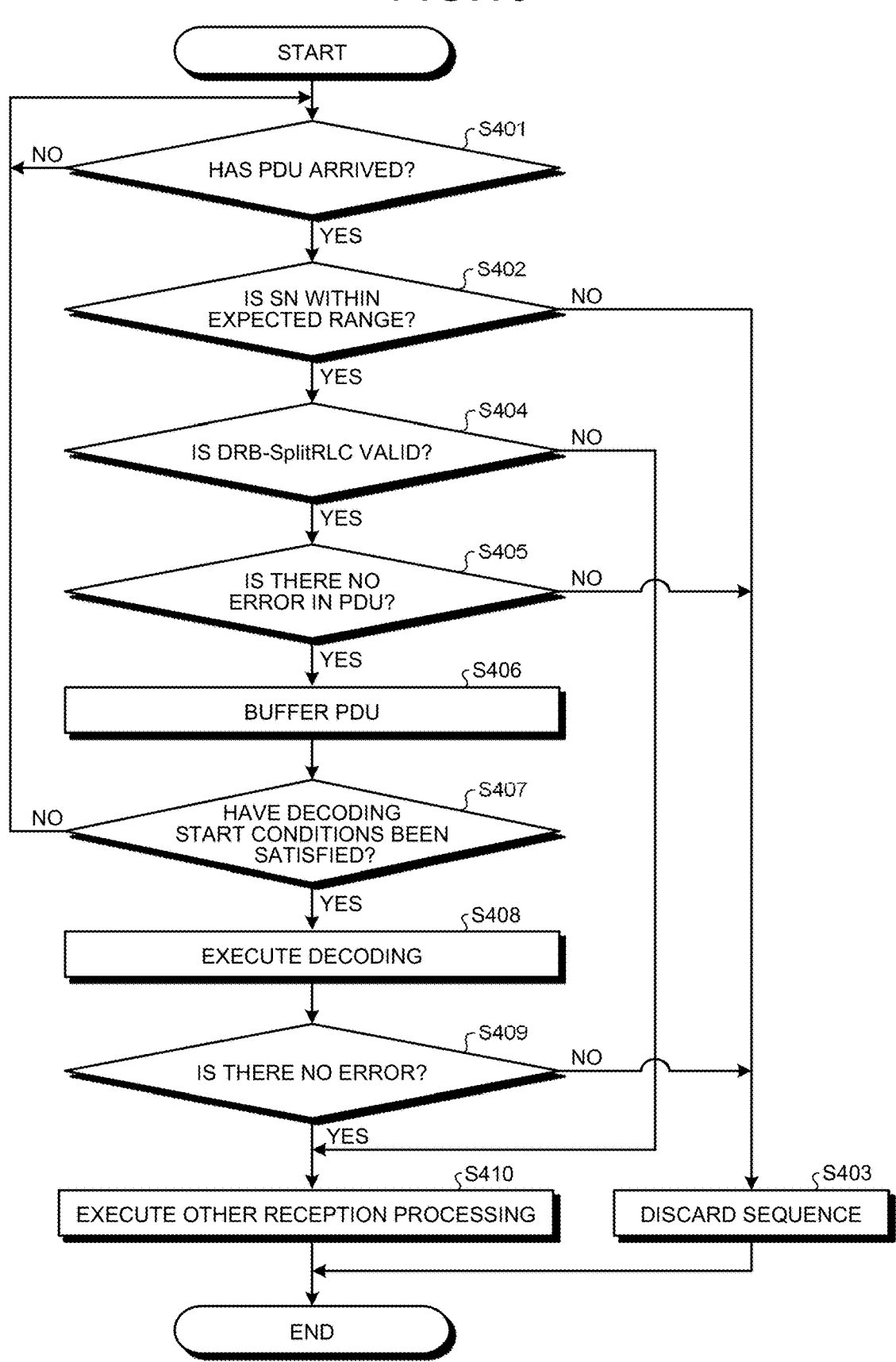
FIG. 18 is a flowchart illustrating reception processing according to the present embodiment.

Next, reception processing will be described. FIG. 18 is a flowchart illustrating reception processing according to the present embodiment. The following processing is executed by the control unit (for example, the control unit 23 of the base station 20 or the control unit 43 of the terminal device 40) of the communication apparatus on the reception side. Note that the communication apparatus on the reception side is not limited to the base station 20 and the terminal device 40, and may be, for example, the relay station 30. In the following description, a communication apparatus on the reception side may be referred to as a reception apparatus.

FIG. 18 illustrates processing from reception of the PDCP PDU from the lower layer to execution of Deciphering and Integrity Verification in a predetermined reception process (for example, a transmission process defined in Non Patent Literature 1 (3GPP TS 38.323 v16.3.0)). This process is desirably processed in parallel for each SN.

First, the discriminator (for example, the discriminator 231 of the base station 20 or the discriminator 431 of the terminal device 40) of the reception apparatus determines whether the PDCP PDU has arrived (Step S401). In a case where the PDCP PDU has not arrived (Step S401: No), the discriminator repeats Step S401 until the PDCP PDU arrives.

In a case where the PDCP PDU has arrived (Step S401: No), the discriminator determines whether or not the SN assigned to the PDCP PDU is within an expected range (Step S402). Here, the SN expected to be received may be a value corresponding to RX_DELIV in Non Patent Literature 1 (3GPP TS 38.323 v16.3.0), or may be other values or a value set by notification. If it is not within the expected range (Step S402: No), the reception apparatus discards the PDCP PDU (Step S403).

Next, the discriminator determines whether or not to decode data (transmission data sequence) by using a decoding method corresponding to packet coding. Various methods can be used for this determination. For example, bearer information indicating whether or not packet coding is used for transmission of the transmission data sequence may be associated with the bearer used for transmission of the transmission data sequence. Then, the discriminator determines whether or not to use a decoding method corresponding to packet coding on the basis of the bearer information. In the present embodiment, it is assumed that the bearer information is DRB-SplitRLC having a value of TRUE/FALSE, but the bearer information is not limited to DRB-SplitRLC. The discriminator discriminates whether the decoding method corresponding to the packet coding is used by determining whether the DRB-SplitRLC of the DRB used for the data transmission is valid (Step S404).

The value of the DRB-SplitRLC on the reception side may also be set when the DRB is established (Establishment) and re-established (Re-establishment). In addition, the value of DRB-SplitRLC may be set by a request of another entity (for example, a PDCP entity). Furthermore, the value of the DRB-SplitRLC may be controlled by RRC signaling, or may be controlled in conjunction with some variable of the RLC entity or the PDCP entity. In addition, the DRB-SplitRLC may be defined from what is defined in a layer higher than the PDCP layer such as 5QI. The definition technique of DRB-SplitRLC is not limited to the above. Further, the discriminator may determine that the multi-path transmission by the packet coding is performed in the communication by using, for example, some variable of the PDCP entity, instead of using the DRB-SplitRLC.

When the DRB-SplitRLC is FALSE (Step S404: No), the reception apparatus immediately performs Deciphering and Integrity Verification on the PDCP PDU (Step S410). This corresponds to the reception processing itself in Non Patent Literature 1 (3GPP TS 38.323 v16.3.0).

When the DRB-SplitRLC is TRUE (Step S404: Yes), the discriminator detects an error in the PDCP PDU (Step S405). This detection is desirably performed using the error detection data assigned to the encoded sequence in the transmission processing. When an error is detected (Step S405: No), the reception apparatus discards the PDCP PDU (Step S403).

When there is no error in the received PDCP PDU (Step S405: Yes), the receiver (for example, the receiver 235 of the base station 20 or the receiver 435 of the terminal device 40) of the reception apparatus classifies the PDU for each SN and stores the PDU in the buffer.

When the number of encoded sequences without an error is not larger than at least the division number determined on the transmission side, the reception apparatus cannot decode the transmitted data sequence. For this reason, it is necessary to buffer the encoded sequence until the decoding start condition is satisfied. The decoding start condition will be described below in the section of UE signaling described below.

The discriminator determines whether a decoding start condition is satisfied (Step S407). For example, the discriminator determines whether the number of PDCP PDUs satisfying a predetermined criterion has been received. When the decoding start condition is not satisfied (Step S407: No), the reception apparatus repeats the processing of Steps S401 to S407 until the decoding start condition is satisfied.

When the decoding start condition is satisfied (Step S407: Yes), the decoder (for example, the decoder 236 of the base station 20 or the decoder 436 of the terminal device 40) of the reception apparatus performs decoding using the PDCP PDU stored in the buffer (Step S408). Thereafter, the discriminator of the reception apparatus detects an error in the decoded sequence (PDCP SDU) (Step S409). When there is an error in the decoded sequence (Step S409: No), the reception apparatus discards the decoded sequence (Step S403). When there is no error in the decoded sequence (PDCP SDU) (Step S409: Yes), the reception apparatus performs Deciphering and Integrity Verification on the decoded sequence (PDCP SDU).

When the processing is completed, the transmission apparatus completes the reception processing.

<4-2. Basic UE Signaling>

Signaling for realizing the motion intended by the procedures illustrated in FIGS. 16 to 18 will be described. FIG. 19 is a sequence diagram illustrating signaling according to the present embodiment. In the following description, a communication apparatus on the reception side may be referred to as a reception apparatus, and a communication apparatus on the transmission side may be referred to as a transmission apparatus.

In the procedure of the present embodiment, the bearer information (DRB-SplitRLC) needs to be synchronized. The bearer information is information indicating whether or not packet coding is used for transmission of the transmission data sequence. When a value of the DRB-SplitRLC is changed on the transmission side or initialization of the DRB occurs, the transmission side needs to notify the reception side. In the example of FIG. 19, the transmission apparatus performs the DRB-SplitRLC change notification (Step S502) at the timing when the DRB-SplitRLC is set (Step S501). This notification may be provided by RRC signaling. When the DRB-SplitRLC is changed in conjunction with any variable held by the PDCP entity or the RLC entity, the variable of the PDCP entity or the RLC entity may be changed by PDCP-Config or RLC-Config which is one of RRC signaling. The reception apparatus that has received the notification by any one of the methods described above sets the DRB-SplitRLC on the reception side according to the notification (Step S503).

Next, the transmission apparatus determines the number of divisions of the transmission data sequence (Step S504). This value is determined by the procedure illustrated in FIG. 17. Thereafter, the transmission apparatus notifies the reception apparatus of information necessary for decoding (Step S505). Here, as the information necessary for decoding, for example, the number of divisions of the transmission data sequence, the code matrix used at the time of coding, the number of generated parity sequences, and the like are assumed. Of course, other information may be included in this notification.

Upon receiving the information necessary for decoding, the reception apparatus sets a condition of a decoding start timing based on the received information (Step S506). This corresponds to the decoding start condition illustrated in FIG. 18. As the decoding start condition, for example, the following (1) to (3) are assumed. Of course, the decoding start trigger may be determined by a method other than the following (1) to (3).

(1) A case where the same number of PDCP PDUs as the number of divisions arrive without errors in the sequence.

(2) A case of arbitrarily setting a value of the PDCP PDU that does not include an error necessary for decoding from the total number of divisions and generated parities and the required reliability.

(3) A case where a timer that prompts start of decoding or a function equivalent thereto is set on the transmission side or the reception side, and decoding processing is started after a set time has elapsed.

In the case of (1), the reception apparatus can start decoding with the minimum number of sequences theoretically required for packet coding. For this reason, it is considered to be effective in a case where the delay requirement is severe, a case where the transmission side is requested to transmit an additional encoded sequence according to the decoding result, and the like.

In the case of (2), the reception apparatus starts decoding, for example, when 10% of a redundancy component of a sequence length (for example, the length of the PDCP SDU) of the source before encoding arrives correctly. The reception side can set reliability accuracy suitable for communication quality defined in advance by 5QI or the like in a region different from the physical layer. Therefore, this method is likely to be effective in a case where the reliability accuracy is set in cooperation with the modulation of the physical layer or the code.

In the case of (3), the reception apparatus starts decoding by an external notification regardless of the number of encoded sequences (PDCP PDUs) that arrive. For example, in a case where the timer is set on the transmission side, the transmission apparatus may set a timer with a certain time limit after encoding, and may notify the reception apparatus to start decoding when the specified time has elapsed. In addition, a timer may be set on the reception side. In this case, for example, the limit and the start timing of the timer may be determined by notification from the transmission side. Notification of these pieces of information may be provided in Step S505 in FIG. 19. In addition, the timer may start at the timing when the PDCP PDU arrives at the reception side for the first time. The limit of the timer may be any value. In addition, the limit of the timer may be a value derived from any variable such as the number of divisions.

The transmission apparatus performs transmission processing including encoding (Step S507). This processing may be the transmission processing illustrated in FIGS. 16 and 17. Although FIG. 19 illustrates that data transmission is performed through a single communication path, parallel transmission is actually performed through a plurality of paths.

The reception apparatus in which the decoding start trigger is set executes the flow illustrated in FIG. 18 every time the PDCP PDU arrives from the lower layer (Steps S508 to S510 in FIG. 19). When the corresponding sequence is discarded in the flow of FIG. 18 (Step S403 in FIG. 18) or when the sequence is correctly stored in the buffer (Step S406 in FIG. 18), the reception apparatus may transmit the ACK/NACK of the sequence (Step S511 in FIG. 19). This notification may be performed arbitrarily. In particular, in a case where an encoded sequence is additionally transmitted in cooperation between transmission and reception, the transmission apparatus may determine determination of additional transmission on the basis of information of this notification. A notification of the ACK/NACK may be provided by, for example, Control PDU for PDCP status report described in Non Patent Literature 1 (3GPP TS 38.323 v16.3.0), or may be provided by another unique method. In addition, a notification of the ACK/NACK may be provided in conjunction with signaling for another layer.

The transmission apparatus optionally makes a notification for starting a decoding process (Step S512). Then, the reception apparatus checks a decoding start trigger (Step S513). When the decoding start trigger is valid, the reception apparatus executes decoding processing (Step S514). After the decoding process is performed, the reception apparatus determines whether or not the decoding is successful by performing error detection of the PDCP PDU (Step S515). At this time, the reception apparatus may notify the transmission side of the ACK/NACK (Step S516). This notification may be arbitrarily performed. In particular, in a case where an encoded sequence is additionally transmitted in cooperation between transmission and reception, the transmission apparatus may determine determination of additional transmission on the basis of information of this notification. A notification of the ACK/NACK may be provided by, for example, Control PDU for PDCP status report described in Non Patent Literature 1 (3GPP TS 38.323 v16.3.0), or may be provided by another unique method. In addition, a notification of the ACK/NACK may be provided in conjunction with signaling for another layer.

5. Modification

The above-described embodiments are examples, and various modifications and applications are possible.

For example, in the above-described embodiment, the transmission apparatus (communication apparatus on the transmission side) is the base station 20 or the terminal device 40, and the reception apparatus (communication apparatus on the reception side) is the base station 20 or the terminal device 40, but the transmission apparatus and the reception apparatus are not limited to this example. For example, either or both of the transmission apparatus and the reception apparatus may include the management device 10 or the relay station 30. Furthermore, either or both of the transmission apparatus and the reception apparatus may include a device (for example, a server device on a network) other than the management device 10, the base station 20, the relay station 30, and the terminal device 40.

The control device that controls the management device 10, the base station 20, the relay station 30, and the terminal device 40 of the present embodiment may be implemented by a dedicated computer system or a general-purpose computer system.

For example, a communication program for executing the above-described operation is stored and distributed in a computer-readable recording medium such as an optical disk, a semiconductor memory, a magnetic tape, or a flexible disk. Then, the control device is configured to, for example, install the program in a computer and perform the above-described processing. At this time, the control device may be a device (for example, a personal computer) outside the management device 10, the base station 20, the relay station 30, and the terminal device 40. Furthermore, the control device may be a device (for example, the control unit 13, the control unit 23, the control unit 33, and the control unit 43) inside the management device 10, the base station 20, the relay station 30, and the terminal device 40.

In addition, the communication program may be stored in a disk device included in a server device on a network such as the Internet so that the program can be downloaded to a computer. In addition, the above-described functions may be implemented by cooperation of an operating system (OS) and application software. In this case, a portion other than the OS may be stored in a medium and distributed, or a portion other than the OS may be stored in a server device and downloaded to a computer.

Among the processes described in the above embodiments, all or a part of the processes described as being performed automatically can be performed manually, or all or a part of the processes described as being performed manually can be performed automatically by a known method. In addition, the processing procedure, specific name, and information including various kinds of data and parameters illustrated in the document and the drawings can be freely changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any units according to various loads, usage conditions, and the like. Note that this configuration by distribution and integration may be performed dynamically.

In addition, the above-described embodiments can be appropriately combined in a region in which the processing contents do not contradict each other. Furthermore, the order of each step illustrated in the flowchart of the above-described embodiment can be appropriately changed.

Furthermore, for example, the present embodiment can be implemented as any configuration configuring a device or a system, for example, a processor as a system Large Scale Integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a set of a plurality of components (devices, modules (parts), and the like), and it does not matter whether or not all the components are in the same housing. Therefore, a plurality of devices housed in separate housings and connected via a network and one device in which a plurality of modules are housed in one housing are both systems.

Furthermore, for example, the present embodiment can adopt a configuration of cloud computing in which one function is shared and processed by a plurality of devices in cooperation via a network.

6. Conclusion

As described above, according to the present embodiment, the transmission apparatus (for example, the base station 20, the relay station 30, or the terminal device 40) determines whether or not to execute packet coding for generating a plurality of encoded bit sequences having different contents from one transmission data sequence according to a predetermined condition. For example, bearer information (for example, DRB-SplitRLC) indicating whether or not to use packet coding for transmission of a transmission data sequence is associated with a bearer (for example, DRB) used for transmission of a transmission data sequence, and the transmission apparatus determines whether or not to perform packet coding on the basis of the bearer information. Then, the transmission apparatus generates a plurality of bit sequences from one transmission data sequence using packet coding when it is determined that packet coding is to be performed, and generates one or a plurality of bit sequences from one transmission data sequence without using packet coding when it is determined that packet coding is not to be performed. When a plurality of bit sequences is generated from one transmission data sequence, the transmission apparatus distributes the generated plurality of bit sequences to a plurality of channels and transmits the distributed bit sequences.

Furthermore, according to the present embodiment, the reception apparatus (for example, the base station 20, the relay station 30, or the terminal device 40) receives one or a plurality of bit sequences from the transmission apparatus. Then, the reception apparatus determines whether or not to decode one or a plurality of bit sequences by using a decoding method corresponding to the packet coding used by the transmission apparatus according to a predetermined condition. For example, bearer information (for example, DRB-SplitRLC) indicating whether or not packet coding is used for transmission of the bit sequence is associated with a bearer (for example, DRB) used for transmission of a transmission data sequence, and the reception apparatus determines whether or not to decode one or a plurality of bit sequences using a decoding method corresponding to the packet coding on the basis of the bearer information. When it is determined to decode using the decoding method corresponding to the packet coding, the reception apparatus decodes the plurality of bit sequences using the decoding method. On the other hand, when it is determined to decode without using the decoding method corresponding to the packet coding, the reception apparatus decodes one or the plurality of bit sequences without using the decoding method.

As a result, the communication apparatus (the transmission apparatus and the reception apparatus) according to the present embodiment can achieve high frequency utilization efficiency while maintaining the communication reliability.

Although the embodiments of the present disclosure have been described above, the technical scope of the present disclosure is not limited to the above-described embodiments as it is, and various changes can be made without departing from the gist of the present disclosure. In addition, components of different embodiments and modifications may be appropriately combined.

Furthermore, the effects of each embodiment described in the present specification are merely examples and are not limited, and other effects may be provided.

Note that the present technology can also have the following configurations.

(1)

A communication apparatus comprising:

a discriminator that determines whether or not to execute packet coding for generating a plurality of encoded bit sequences having different contents from one transmission data sequence, according to a predetermined condition;

a generator that generates a plurality of bit sequences from one transmission data sequence using the packet coding in a case where it is determined that the packet coding is to be performed, and generates one or a plurality of bit sequences from one transmission data sequence without using the packet coding in a case where it is determined that the packet coding is not to be performed; and a distributor that distributes the plurality of bit sequences to a plurality of channels in a case where the plurality of bit sequences has been generated from the one transmission data sequence.

(2)

The communication apparatus according to (1), wherein bearer information indicating whether or not packet coding is usable for transmission of the transmission data sequence is associated with a bearer used for transmission of the transmission data sequence, and the discriminator determines whether or not to perform packet coding on the basis of the bearer information.

(3)

The communication apparatus according to (1) or (2), wherein the generator determines the number of encoded bit sequences generated by the packet coding according to a distribution method of the plurality of bit sequences to the plurality of channels, and executes the packet coding so that the determined number of encoded bit sequences are generated.

(4)

The communication apparatus according to (3), wherein the generator determines the number of encoded bit sequences generated by the packet coding according to the number of valid channels that is usable to transmit the transmission data sequence, and executes the packet coding so that the determined number of encoded bit sequences are generated.

(5)

The communication apparatus according to (4), wherein the distributor distributes the plurality of bit sequences to the plurality of channels by a distribution method of evenly distributing the bit sequences to each of a plurality of valid channels.

(6)

The communication apparatus according to (4), wherein the distributor distributes the plurality of bit sequences to the plurality of channels by a distribution method of determining the number of bit sequences to be distributed for each of a plurality of valid channels.

(7)

The communication apparatus according to (6), wherein the distributor determines the number of distribution bit sequences of each of the plurality of valid channels on the basis of the data transmission time of each of the plurality of valid channels.

(8)

The communication apparatus according to (6), wherein the distributor determines the number of distribution bit sequences of each of the plurality of valid channels on the basis of the state of a physical layer of each of the plurality of valid channels.

(9)

The communication apparatus according to (6), wherein the distributor determines the number of distribution bit sequences of each of the plurality of valid channels on the basis of the buffer usage of each of the plurality of valid channels.

(10)

The communication apparatus according to any one of (1) to (9), wherein the packet coding processing includes a procedure of dividing the one transmission data sequence into a plurality of source bit sequences, and a procedure of generating the plurality of encoded bit sequences from the plurality of source bit sequences by applying encoding processing according to a predetermined error correction coding scheme to the plurality of source bit sequences.

(11)

The communication apparatus according to (10), wherein the generator determines the number of divisions of the one transmission data sequence on the basis of information on reliability required for transmission of the transmission data sequence, and divides the one transmission data sequence into a plurality of source bit sequences so that the determined number of divisions is obtained.

(12)

The communication apparatus according to (10), wherein the communication apparatus is a terminal device, and the generator determines the number of divisions of the one transmission data sequence on the basis of a notification from a base station, and divides the one transmission data sequence into a plurality of source bit sequences so that the determined number of divisions is obtained.

(13)

The communication apparatus according to (10), wherein the generator determines the number of divisions of the one transmission data sequence on the basis of a state of a physical layer of a valid channel that can be used for transmission of the transmission data sequence, and divides the one transmission data sequence into a plurality of source bit sequences so that the determined number of divisions is obtained.

(14)

The communication apparatus according to any one of (10) to (13), wherein the predetermined error correction coding scheme is at least one error correction coding scheme among Erasure codes, Rateless codes, Fountain codes, Tornado codes, Luby Transform (LT) codes, Raptor codes, RaptorQ codes, Low Density Parity Check (LDPC) codes, BCH codes, Reed Solomon (RS) codes, and eXclusive OR (XOR) codes.

(15)

A communication apparatus comprising:

a receiver that receives one or a plurality of bit sequences from another communication apparatus capable of transmitting data using a plurality of channels;

a discriminator that determines whether or not to decode the one or a plurality of bit sequences by using a decoding method corresponding to packet coding for generating a plurality of encoded bit sequences having different contents from one transmission data sequence, according to a predetermined condition; and a decoder that decodes the plurality of bit sequences using a decoding method corresponding to the packet coding when it is determined to decode the plurality of bit sequences using a decoding method corresponding to the packet coding, and decodes the one or the plurality of bit sequences without using a decoding method corresponding to the packet coding when it is determined to decode the one or the plurality of bit sequences without using a decoding method corresponding to the packet coding.

(16)

The communication apparatus according to (15), wherein bearer information indicating whether or not packet coding is used for transmission of the transmission data sequence is associated with a bearer used for transmission of the transmission data sequence, and the discriminator determines whether or not to decode the one or the plurality of bit sequences using a decoding method corresponding to the packet coding on the basis of the bearer information.

(17)

The communication apparatus according to (15) or (16), wherein the decoder decodes the plurality of bit sequences using a decoding method corresponding to the packet coding at a timing when the number of bit sequences satisfying a predetermined criterion is received.

(18)

A communication method comprising:

determining whether or not to execute packet coding for generating a plurality of encoded bit sequences having different contents from one transmission data sequence, according to a predetermined condition;

generating a plurality of bit sequences from one transmission data sequence using the packet coding in a case where it is determined that the packet coding is to be performed, and generates one or a plurality of bit sequences from one transmission data sequence without using the packet coding in a case where it is determined that the packet coding is not to be performed; and distributing the plurality of bit sequences to a plurality of channels in a case where the plurality of bit sequences has been generated from the one transmission data sequence.

(19)

A communication method comprising:

receiving one or a plurality of bit sequences from another communication apparatus capable of transmitting data using a plurality of channels;

determining whether or not to decode the one or a plurality of bit sequences by using a decoding method corresponding to packet coding for generating a plurality of encoded bit sequences having different contents from one transmission data sequence, according to a predetermined condition; and decoding the plurality of bit sequences using a decoding method corresponding to the packet coding when it is determined to decode the plurality of bit sequences using a decoding method corresponding to the packet coding, and decoding the one or the plurality of bit sequences without using a decoding method corresponding to the packet coding when it is determined to decode the one or the plurality of bit sequences without using a decoding method corresponding to the packet coding.

(20)

A communication system comprising: a first communication apparatus capable of transmitting data using a plurality of channels; and a second communication apparatus receiving data from the first communication apparatus, wherein the first communication apparatus includes:

a first discriminator that determines whether or not to execute packet coding for generating a plurality of encoded bit sequences having different contents from one transmission data sequence, according to a predetermined condition;

a generator that generates a plurality of bit sequences from one transmission data sequence using the packet coding in a case where it is determined that the packet coding is to be performed, and generates one or a plurality of bit sequences from one transmission data sequence without using the packet coding in a case where it is determined that the packet coding is not to be performed; and a distributor that distributes a plurality of bit sequences to a plurality of channels in a case where the plurality of bit sequences is generated from the one transmission data sequence, and the second communication apparatus includes:

a receiver that receives the one or the plurality of bit sequences;

a second discriminator that determines whether or not to decode the one or the plurality of bit sequences by using a decoding method corresponding to the packet coding, according to a predetermined condition; and a decoder that decodes the plurality of bit sequences using a decoding method corresponding to the packet coding when it is determined to decode the plurality of bit sequences using a decoding method corresponding to the packet coding, and decodes the one or the plurality of bit sequences without using a decoding method corresponding to the packet coding when it is determined to decode the one or the plurality of bit sequences without using a decoding method corresponding to the packet coding.

REFERENCE SIGNS LIST

1 COMMUNICATION SYSTEM
10 MANAGEMENT DEVICE
20 BASE STATION
30 RELAY STATION
40 TERMINAL DEVICE
11 COMMUNICATION UNIT
21, 31, 41 WIRELESS COMMUNICATION UNIT
12, 22, 32, 42 STORAGE UNIT
13, 23, 33, 43 CONTROL UNIT
211, 311, 411 TRANSMISSION PROCESSING UNIT
212, 312, 412 RECEPTION PROCESSING UNIT
213, 313, 413 ANTENNA
231, 431 DISCRIMINATOR
232, 432 GENERATOR
233, 433 DISTRIBUTOR
234, 434 TRANSMITTER
235, 435 RECEIVER
236, 436 DECODER

The invention claimed is:

1. A communication apparatus, comprising:

a central processing unit (CPU) configured to:

determine, based on bearer information, one of an execution of a packet coding or a non-execution of the packet coding on a transmission data sequence, wherein the bearer information indicates usability of the packet coding for transmission of the transmission data sequence, the bearer information is associated with a bearer, and the bearer is for the transmission of the transmission data sequence;

generate a first plurality of encoded bit sequences from the transmission data sequence based on the determination of the execution of the packet coding, wherein the first plurality of encoded bit sequences is generated based on the packet coding, and content of each of the first plurality of encoded bit sequences is different;

generate a second plurality of bit sequences from the transmission data sequence based on the determination of the non-execution of the packet coding; and distribute one of the first plurality of encoded bit sequences or the second plurality of bit sequences to a plurality of channels.

2. The communication apparatus according to claim 1, wherein the CPU is further configured to:

determine a distribution method of the first plurality of encoded bit sequences to the plurality of channels;

determine a first number of encoded bit sequences for the transmission data sequence based on the determined distribution method; and execute the packet coding to generate the determined first number of encoded bit sequences, wherein the generated first plurality of encoded bit sequences includes the determined first number of encoded bit sequences.

3. The communication apparatus according to claim 2, wherein the CPU is further configured to:

determine a plurality of valid channels from the plurality of channels for the transmission of the transmission data sequence; and determine the first number of encoded bit sequences based on the determined plurality of valid channels.

4. The communication apparatus according to claim 3, wherein the CPU is further configured to distribute the first plurality of encoded bit sequences to the plurality of channels based on the determined distribution method, and the determined distribution method corresponds to even distribution of the first plurality of encoded bit sequences to each of the plurality of valid channels.

5. The communication apparatus according to claim 3, wherein the CPU is further configured to distribute the first plurality of encoded bit sequences to the plurality of channels based on the determined distribution method, and the determined distribution method corresponds to determination of a second number of bit sequences from the first plurality of encoded bit sequences for each of the plurality of valid channels.

6. The communication apparatus according to claim 5, wherein the CPU is further configured to determine the second number of bit sequences for each of the plurality of valid channels based on data transmission time of each of the plurality of valid channels.

7. The communication apparatus according to claim 5, wherein the CPU is further configured to determine the second number of bit sequences for each of the plurality of valid channels based on a state of a physical layer of each of the plurality of valid channels.

8. The communication apparatus according to claim 5, wherein the CPU is further configured to determine the second number of bit sequences for each of the plurality of valid channels based on buffer usage of each of the plurality of valid channels.

44

9. The communication apparatus according to claim 1, wherein the packet coding includes:

a first procedure to divide the transmission data sequence into a plurality of source bit sequences; and a second procedure to generate the first plurality of encoded bit sequences from the plurality of source bit sequences, wherein the first plurality of encoded bit sequences is generated based on an encoding process on the plurality of source bit sequences, and the encoding process on the plurality of source bit sequences is based on a specific error correction coding scheme.

10. The communication apparatus according to claim 9, wherein the CPU is further configured to:

determine a number of divisions of the transmission data sequence based on reliability information, wherein the reliability information is associated with the transmission of the transmission data sequence; and divide the transmission data sequence into the plurality of source bit sequences based on the determined number of divisions of the transmission data sequence.

11. The communication apparatus according to claim 9, wherein the communication apparatus is a terminal device, and the CPU is further configured to:

determine a number of divisions of the transmission data sequence based on a notification from a base station; and divide the transmission data sequence into the plurality of source bit sequences based on the determined number of divisions of the transmission data sequence.

12. The communication apparatus according to claim 9, wherein the CPU is further configured to:

determine a number of divisions of the transmission data sequence based on a state of a physical layer of a valid channel of the plurality of channels, wherein the valid channel is for the transmission of the transmission data sequence; and divide the transmission data sequence into the plurality of source bit sequences based on the determined number of divisions of the transmission data sequence.

13. The communication apparatus according to claim 9, wherein the specific error correction coding scheme is at least one of Erasure codes, Rateless codes, Fountain codes, Tornado codes, Luby Transform (LT) codes, Raptor codes, RaptorQ codes, Low Density Parity Check (LDPC) codes, Bose-Chaudhuri-Hocquenghem (BCH) codes, Reed Solomon (RS) codes, or exclusive OR (XOR) codes.

14. A first communication apparatus, comprising:

a central processing unit (CPU) configured to:

receive a plurality of bit sequences from a second communication apparatus, wherein the second communication apparatus transmits the plurality of bit sequences via a plurality of channels;

determine, based on bearer information, one of decoding of the plurality of bit sequences is via a decoding method or decoding of the plurality of bit sequences excludes the decoding method, wherein the decoding method corresponds to a packet coding, the packet coding is for generation of a plurality of encoded bit sequences, as the plurality of bit sequences, from a transmission data sequence, content of each of the plurality of encoded bit sequences is different, the bearer information indicates usability of the
packet coding for transmission of the transmission
data sequence,
the bearer information is associated with a bearer,
and
the bearer is for the transmission of the transmission
data sequence;
decode the plurality of bit sequences via the decoding
method, based on the determination that the decod-
ing of the plurality of bit sequences is via the
decoding method; and
decode the plurality of bit sequences based on the deter-
mination that the decoding of the plurality of bit
sequences excludes the decoding method.
15. The first communication apparatus according to claim
14, wherein the CPU is further configured to:
decode the plurality of bit sequences via the decoding
method at a time of reception of a set of bit sequences
of the plurality of bit sequences, wherein a number of
the set of bit sequences is within a specific criterion.
16. A communication method, comprising:
determining, based on bearer information, one of an
execution of a packet coding or a non-execution of the
packet coding on a transmission data sequence,
wherein
the bearer information indicates usability of the packet
coding for transmission of the transmission data
sequence,
the bearer information is associated with a bearer, and
the bearer is for the transmission of the transmission
data sequence;
generating a first plurality of encoded bit sequences from
the transmission data sequence based on the determi-
nation of the execution of the packet coding, wherein
the first plurality of encoded bit sequences is generated
based on the packet coding, and
content of each of the first plurality of encoded bit
sequences is different;
generating a second plurality of bit sequences from the
transmission data sequence based on the determination
of the non-execution of the packet coding; and
distributing one of the first plurality of encoded bit
sequences or the second plurality of bit sequences to a
plurality of channels.
17. A communication method, comprising:
receiving a plurality of bit sequences from a communi-
cation apparatus, wherein the communication appara-
tus transmits the plurality of bit sequences via a plu-
rality of channels;
determining, based on bearer information, one of decod-
ing of the plurality of bit sequences is via a decoding
method or decoding of the plurality of bit sequences
excludes the decoding method, wherein
the decoding method corresponds to a packet coding,
the packet coding is for generation of a plurality of
encoded bit sequences, as the plurality of bit
sequences, from a transmission data sequence,
content of each of the plurality of encoded bit
sequences is different,
the bearer information indicates usability of the packet
coding for transmission of the transmission data
sequence,
the bearer information is associated with a bearer, and the bearer is for the transmission of the transmission
data sequence;
decoding the plurality of bit sequences via the decoding
method, based on the determination that the decoding
of the plurality of bit sequences is via the decoding
method; and
decoding the plurality of bit sequences based on the
determination that the decoding of the plurality of bit
sequences excludes the decoding method.
18. A communication system, comprising:
a first communication apparatus configured to transmit
data using a plurality of channels; and
a second communication apparatus configured to receive
the data from the first communication apparatus,
wherein
the first communication apparatus includes a first cen-
tral processing unit (CPU) configured to:
determine, based on bearer information, one of an
execution of a packet coding or a non-execution of
the packet coding on a transmission data
sequence, wherein
the bearer information indicates usability of the
packet coding for transmission of the transmis-
sion data sequence,
the bearer information is associated with a bearer,
and
the bearer is for the transmission of the transmis-
sion data sequence;
generate a first plurality of encoded bit sequences
from the transmission data sequence based on the
determination of the execution of the packet cod-
ing, wherein
the first plurality of encoded bit sequences is
generated based on the packet coding, and
content of each of the first plurality of encoded bit
sequences is different;
generate a second plurality of bit sequences from the
transmission data sequence based on the determi-
nation of the non-execution of the packet coding;
and
distribute one of the first plurality of encoded bit
sequences or the second plurality of bit sequences
to the plurality of channels, and
the second communication apparatus includes a second
central processing unit (CPU) configured to:
receive a third plurality of bit sequences including
one of the first plurality of encoded bit sequences
or the second plurality of bit sequences;
determine, based on the bearer information, one of
decoding of the third plurality of bit sequences is
via a decoding method or decoding of the third
plurality of bit sequences excludes the decoding
method, wherein
the decoding method corresponds to the packet cod-
ing;
decode the third plurality of bit sequences via the
decoding method, based on the determination that
the decoding of the third plurality of bit sequences
is via the decoding method; and
decode the third plurality of bit sequences based on
the determination that the decoding of the third
plurality of bit sequences excludes the decoding
method.

* * * * *